(12) United States Patent
Bae et al.

(10) Patent No.: US 12,433,867 B2
(45) Date of Patent: Oct. 7, 2025

(54) PHARMACEUTICAL COMPOSITION COMPRISING FLT3 INHIBITOR AND HYPOMETHYLATING AGENT FOR TREATING ACUTE MYELOID LEUKEMIA

(71) Applicant: HANMI PHARM. CO., LTD, Hwaseong-si (KR)

(72) Inventors: In Hwan Bae, Hwaseong-si (KR); Ji Sook Kim, Hwaseong-si (KR); Jae Yul Choi, Hwaseong-si (KR); Young Gil Ahn, Hwaseong-si (KR)

(73) Assignee: Hanmi Pharm. Co., Ltd., Hwaseong-si (KR)

( * ) Notice: Subject to any disclaimer, the term of this patent is extended or adjusted under 35 U.S.C. 154(b) by 1084 days.

(21) Appl. No.: 17/432,699

(22) PCT Filed: Feb. 21, 2020

(86) PCT No.: PCT/KR2020/002536
§ 371 (c)(1),
(2) Date: Aug. 20, 2021

(87) PCT Pub. No.: WO2020/171646
PCT Pub. Date: Aug. 27, 2020

(65) Prior Publication Data
US 2022/0110913 A1 Apr. 14, 2022

(30) Foreign Application Priority Data

Feb. 22, 2019 (KR) .................. 10-2019-0021228
Feb. 21, 2020 (KR) .................. 10-2020-0021502

(51) Int. Cl.
*A61K 31/404* (2006.01)
*A61P 35/02* (2006.01)

(52) U.S. Cl.
CPC ............ *A61K 31/404* (2013.01); *A61P 35/02* (2018.01)

(58) Field of Classification Search
CPC ... A61P 35/02; A61K 31/506; A61K 31/4025; A61K 31/404
See application file for complete search history.

(56) References Cited

U.S. PATENT DOCUMENTS

| 8,461,170 B2 | 6/2013 | Aquila et al. |
| 8,492,429 B2 | 7/2013 | Griffin et al. |

(Continued)

FOREIGN PATENT DOCUMENTS

| CN | 101111490 A | 1/2008 |
| CN | 101622015 A | 1/2010 |

(Continued)

OTHER PUBLICATIONS

Ueno et al (Blood vol. 128 p. 2830. Published 2016) (Year: 2016).*

(Continued)

*Primary Examiner* — George W Kosturko
(74) *Attorney, Agent, or Firm* — COOLEY LLP

(57) ABSTRACT

Provided are a pharmaceutical composition for treating acute myeloid leukemia (AML), the pharmaceutical composition containing an Fms-like tyrosine kinase (Fms-like tyrosine kinase-3: FLT3) inhibitor or a pharmaceutically acceptable salt or solvate thereof, and a hypomethylating agent (HMA) or a pharmaceutically acceptable salt or solvate thereof in a therapeutically effective combination, and a method of treating AML using the composition.

11 Claims, 3 Drawing Sheets

(56) References Cited

U.S. PATENT DOCUMENTS

| | | | |
|---|---|---|---|
| 9,796,712 B2 | 10/2017 | Huang et al. | |
| 10,280,154 B2 | 5/2019 | Ham et al. | |
| 10,519,141 B2 | 12/2019 | Ham et al. | |
| 10,870,639 B2 | 12/2020 | Bae et al. | |
| 11,292,786 B2 * | 4/2022 | Bae | A61P 35/02 |
| 2009/0318446 A1 | 12/2009 | Fischer et al. | |
| 2010/0056467 A1 | 3/2010 | Griffin et al. | |
| 2010/0104567 A1 | 4/2010 | Shiotsu et al. | |
| 2010/0249176 A1 | 9/2010 | Barrow et al. | |
| 2011/0009365 A1 | 1/2011 | Dubois et al. | |
| 2011/0015173 A1 | 1/2011 | Florjancic et al. | |
| 2011/0183975 A1 | 7/2011 | Goto et al. | |
| 2013/0137650 A1 | 5/2013 | Armstrong et al. | |
| 2017/0029413 A1 | 2/2017 | Holladay et al. | |
| 2017/0216302 A1 | 8/2017 | Seki | |
| 2017/0281566 A1 | 10/2017 | Ciceri et al. | |
| 2017/0355696 A1 | 12/2017 | Jiang | |
| 2018/0071290 A1 | 3/2018 | Cai et al. | |
| 2019/0031643 A1 | 1/2019 | Ham et al. | |
| 2019/0117649 A1 | 4/2019 | Bahceci et al. | |
| 2019/0125747 A1 | 5/2019 | Rezaei et al. | |
| 2019/0127353 A1 | 5/2019 | Ham et al. | |
| 2019/0298719 A1 | 10/2019 | Ferretti et al. | |
| 2019/0314380 A1 | 10/2019 | Falini et al. | |
| 2020/0031806 A1 | 1/2020 | Bae et al. | |
| 2020/0062775 A1 | 2/2020 | Xue et al. | |
| 2020/0206266 A1 | 7/2020 | Hudecek et al. | |
| 2020/0255410 A1 | 8/2020 | Bae et al. | |
| 2020/0360372 A1 | 11/2020 | Bahceci et al. | |
| 2022/0354842 A1 | 11/2022 | Bae et al. | |
| 2023/0002358 A1 | 1/2023 | Bae | |
| 2024/0423979 A1 | 12/2024 | Kim et al. | |

FOREIGN PATENT DOCUMENTS

| | | | |
|---|---|---|---|
| CN | 102471339 A | 5/2012 | |
| CN | 108883109 A | 11/2018 | |
| CN | 113166110 A | 7/2021 | |
| EA | 201692261 A1 | 5/2017 | |
| EA | 039868 B1 | 3/2022 | |
| EP | 2133095 A1 | 12/2009 | |
| EP | 3514153 A1 | 7/2019 | |
| EP | 3928780 A1 | 12/2021 | |
| JP | 2008526824 A | 7/2008 | |
| JP | WO2008111441 A1 | 6/2010 | |
| JP | 2011500808 A | 1/2011 | |
| JP | 2011510052 A | 3/2011 | |
| JP | 2012521435 A | 9/2012 | |
| JP | 2012533553 A | 12/2012 | |
| JP | 2017510651 A | 4/2017 | |
| JP | 2018535975 A | 12/2018 | |
| JP | 2019531315 A | 10/2019 | |
| JP | 6608565 B2 | 11/2019 | |
| KR | 20080021126 A | 3/2008 | |
| KR | 10-2009-0087094 A | 8/2009 | |
| KR | 20090115866 A | 11/2009 | |
| KR | 20170012766 A | 2/2017 | |
| KR | 101755725 B1 | 7/2017 | |
| KR | 20170101908 A | 9/2017 | |
| KR | 20170123602 A | 11/2017 | |
| KR | 20180086768 A | 8/2018 | |
| KR | 20180088317 A | 8/2018 | |
| KR | 20180117710 A | 10/2018 | |
| KR | 10-2018-0124055 A | 11/2018 | |
| KR | 10-1954370 B1 | 3/2019 | |
| KR | 20190084292 A | 7/2019 | |
| KR | 20200016567 A | 2/2020 | |
| KR | 102110573 B1 | 5/2020 | |
| KR | 20200102948 A | 9/2020 | |
| MX | 2019008808 A | 9/2019 | |
| TW | 201829396 A | 8/2018 | |
| WO | WO-2006075152 A1 | 7/2006 | |
| WO | WO-2006135639 A1 | 12/2006 | |
| WO | WO-2008067280 A2 | 6/2008 | |
| WO | WO-2009054983 A1 | 4/2009 | |
| WO | WO-2009109710 A1 | 9/2009 | |
| WO | WO-2010049731 A1 | 5/2010 | |
| WO | WO-2010051781 A1 | 5/2010 | |
| WO | WO-2010111172 A1 | 9/2010 | |
| WO | WO-2011008915 A1 | 1/2011 | |
| WO | WO-2011162515 A2 | 12/2011 | |
| WO | WO-2013014448 A1 | 1/2013 | |
| WO | WO-2013146963 A1 | 10/2013 | |
| WO | WO-2014155300 A2 | 10/2014 | |
| WO | WO-2015154038 A1 | 10/2015 | |
| WO | WO-2015154039 A2 | 10/2015 | |
| WO | WO-2015154039 A3 | 12/2015 | |
| WO | WO-2016029839 A1 | 3/2016 | |
| WO | WO-2015154039 A8 | 10/2016 | |
| WO | WO-2017083592 A1 | 5/2017 | |
| WO | WO-2017157813 A1 | 9/2017 | |
| WO | WO-2017170348 A1 * | 10/2017 | A61K 31/497 |
| WO | WO-2018002217 A1 | 1/2018 | |
| WO | WO-2018118842 A1 | 6/2018 | |
| WO | WO-2018134213 A1 | 7/2018 | |
| WO | 2018/139903 A1 | 8/2018 | |
| WO | WO-2018156578 A1 | 8/2018 | |
| WO | WO-2019164846 A1 | 8/2019 | |
| WO | WO-2020014643 A1 | 1/2020 | |
| WO | WO-2020022600 A1 | 1/2020 | |
| WO | WO-2020171646 A1 | 8/2020 | |
| WO | WO-2020171649 A1 | 8/2020 | |
| WO | WO-2020262974 A1 | 12/2020 | |
| WO | WO-2021066443 A1 | 4/2021 | |
| WO | WO-2021159993 A1 | 8/2021 | |
| WO | WO-2022098083 A1 | 5/2022 | |
| WO | WO-2023068858 A1 | 4/2023 | |
| WO | WO-2024096708 A1 | 5/2024 | |
| WO | WO-2024124199 A1 | 6/2024 | |
| WO | WO-2024248513 A1 | 12/2024 | |

OTHER PUBLICATIONS

Heiko Konig et al., "The Combination of FLT3 Inhibition and Hypomethylation Confers Synergistic Anti-Leukemic Effects on FLT3/ITD Positive AML Cell Lines and Primary Cells", Blood, Nov. 15, 2013, 4 pgs., vol. 122, No. 21.

Ellen Weisberg et al., "Potentiation of antileukemic therapies by Smac mimetic, LBW242: effects on mutant FLT3-expressing cells", Molecular Cancer Therapeutics, Jul. 2007, 12 pgs., vol. 6, No. 7.

Bing Z. Carter et al., "Synergistic Targeting of AML Stem/Progenitor Cells With IAP Antagonist Birinapant and Demethylating Agents", JNCI, Feb. 5, 2014, 12 pgs., vol. 106, No. 2.

E. Weisberg et al., "Drug resistance in mutant FLT3-positive AML", Oncogene, 2010, pp. 5120-5134, vol. 29.

International Search Report for PCT/KR2020/002536 dated, Jun. 4, 2020 (PCT/ISA/210).

International Preliminary Report on Patentability for International Patent Application No. PCT/KR2021/015794 dated May 8, 2023, and English translation, 4 pages.

International Search Report and English translation for International Patent Application No. PCT/KR2021/015794 mailed Feb. 10, 2022, and English translation, 9 pages.

Written Opinion for International Patent Application No. PCT/KR2021/015794 mailed Feb. 10, 2022, and English translation 6 pages.

Co-pending U.S. Appl. No. 18/251,827, inventors BAE; In Hwan et al., filed May 4, 2023.

[Author Unknown] "Khimicheskiy entsiklopedicheskiy slovar" (Chemical Encyclopedic Dictionary), Moscow: «Sovetskaya Entsiklopediya», 1983, pp. 130-131, and English translation of relevant portion, 7 pages.

Bastin et al., "Salt Selection and Optimisation Procedures for Pharmaceutical New Chemical Entities," Organic Process Research and Development (Jul. 19, 2000); 4(5): 427-435.

Belikov, V.G ,"Pharmaceutical Chemistry. Chapter 2.6 Relationship between the chemical structure, properties of substances and their effect on the body-M," MEDpress-inform, 2007, pp. 27-29, and English translation, 14 pages.

(56) References Cited

OTHER PUBLICATIONS

Kümmerer, K., et al., "Pharmaceuticals in the Environment," Annual Review of Environment and Resources (2010); vol. 35, pp. 57-75. Epub Aug. 18, 2010.
Pokrovsky, V.I., "Small Medical Encyclopedia," Medicine, 1996, V5, pp. 90-96, and English translation of relevant portion, 12 pages.
Advani, Anjali S., "FL T3 and Acute Myelogenous Leukemia: Biology, Clinical Significance and Therapeutic Applications", Current Pharmaceutical Design, 2005, vol. 11, No. 26, pp. 3449-3457.
Araki, Shinsuke et al., "Inhibitors of CLK Protein Kinases Suppress Cell Growth and Induce Apoptosis by Modulating Pre-mRNA Splicing", PLOS One, Jan. 12, 2015, vol. 10, 18 pages.
Benson et al., "Identification of Telmisartan as a Unique Angiotensin II Receptor Antagonist With Selective PPARγ-Modulating Activity", Hypertension, May 2004, vol. 43, pp. 993-1002.
Buglio, D., et al., "Essential Role of TAK1 in Regulating Mantle Cell Lymphoma Survival," Blood, 2012, vol. 120(2), pp. 347-355.
Extended European Search Report for European Patent Application No. 18744290.0 dated Mar. 31, 2020, 7 pages.
Extended European Search Report for European Patent Application No. 19841611.7 dated Mar. 17, 2022, 11 pages.
Extended European Search Report for European Patent Application No. 20201112.8 dated Feb. 5, 2021, 6 pages.
Huang, et al., "Synthesis and biological study of 2-amino-4-aryl-5-chloropyrimidine analogues as inhibitors of VEGFR-2 and cyclin dependent kinase 1 (CDK1)". Bioorganic & Medicinal Chemistry Letters (Apr. 15, 2007); 17(8): 2179-2183. Epub Feb. 2, 2007.
International Preliminary Report on Patentability for International Patent Application No. PCT/KR2020/002536 mailed Aug. 10, 2021, and English translation, 10 pages.
International Preliminary Report on Patentability for International Patent Application No. PCT/KR2020/008258 mailed Dec. 28, 2021, and English translation, 8 pages.
International Search Report and Written Opinion for International Patent Application No. PCT/KR2020/013188 dated Jun. 4, 2020, and English translation of ISR, 15 pages.
International Search Report for International Patent Application No. PCT/KR2018/001193 dated May 2, 2018, and English translation, 7 pages.
International Search Report for International Patent Application No. PCT/KR2019/001737 mailed May 8, 2019, 4 pages.
International Search Report for International Patent Application No. PCT/KR2020/002536 dated Jun. 4, 2020, and English translation, 5 pages.
International Search Report for International Patent Application No. PCT/KR2020/008258 dated Sep. 22, 2020, and English translation, 7 pages.
Khurana and Shafer, "MDM2 antagonists as a novel treatment option for acute myeloid leukemia: perspectives on the therapeutic potential of idasanutlin (RG7388)". Onco Targets Ther. (2019); 12: 2903-2910. Epub Apr. 16, 2019.
Kiyoi et al., "FLT3 mutations in acute myeloid leukemia: Therapeutic paradigm beyond inhibitor development.". Cancer Science, Feb. 2020; 111(2): 312-322.
Kliche, Stefanie et al., "VEGF Receptor Signaling and Endothelial Function", IUBMB Life, 2001, vol. 51, pp. 61-66, 6 pages.
Lee et al., "FL T3MutationsConfer Enhanced Proliferation and Survival Properties to Multipotent Progenitors in a Murine Model of Chronic Myelomonocytic Leukemia", Cancer Cell, Oct. 2007, vol. 12, pp. 367-380.
Liu et al., "Syk inhibitors in clinical development for hematological malignancies", Journal of Hematology and Oncology, 2017, 10:145, 7 pages.
McMahon et al., "Clonal Selection with RAS Pathway Activation Mediates Secondary Clinical Resistance to Selective FLT3 Inhibition in Acute Myeloid Leukemia". Cancer Discov, 2019, 9 (8): 1050-1063.
Melnikova, Irena et al., "Targeting protein kinases", Nature Reviews Drug Discovery, Dec. 2004, pp. 993-994, 2 pages.
Moore et al., "Selective FL T3 inhibition of FL T3-ITD t acute myeloid leukaemia resulting in secondary D835Y mutation: a model for emerging clinical resistance patterns", Leukemia, 2012, pp. 1462-1470.
Paccez, Juliano D. et al., "The receptor tyrosine kinase Axl in cancer: biological functions and therapeutic implications", International Journal of Cancer, 2014, 39 pages, vol. 134.
Seipel et al., "Pabst T. MDM2- and FLT3-inhibitors in the treatment of FLT3-ITD acute myeloid leukemia, specificity and efficacy of NVP-HDM201 and midostaurin". Haematologica, Nov. 2018; 103(11): 1862-1872. Pre-published: Jul. 5, 2018.
Simons, Michael et al., "Mechanisms and regulation of endothelial VEGF receptor signalling", Nature Reviews Molecular Cell Biology, Oct. 2016, vol. 17, pp. 611-625, 15 pages.
Smith et al., "Validation of ITD mutations in FLT3 as a therapeutic target in human acute myeloid leukaemia", Nature, 2012, vol. 000, p. 1-6.
Sun, Xianglan et al., :"The regulation and function of the NUAK family", Journal of Molecular Endocrinology, 2013, 9 pages, vol. 51.
Ueno, et al., "Evaluation of gilteritinib in combination with chemotherapy in preclinical models of FLT3-ITD+ acute myeloid leukemia". Oncotarget (2019); 10(26): 2530-2545.
Wang et al., "Crenolanib, a Type I FLT3 TKI, Can be Safely Combined with Cytarabine and Anthracycline Induction Chemotherapy and Results in High Response Rates in Patients with Newly Diagnosed FLT3 Mutant Acute Myeloid Leukemia (AML)". Blood. Jan. 1, 2016; 128(22): 1071, 4 pages.
Written Opinion for International Patent Application No. PCT/KR2018/001193 dated May 2, 2018, and English translation, 12 pages.
Written Opinion for International Patent Application No. PCT/KR2019/001737 mailed May 8, 2019, 4 pages.
Written Opinion for International Patent Application No. PCT/KR2020/002536 dated Jun. 4, 2020, and English translation, 16 pages.
Written Opinion for International Patent Application No. PCT/KR2020/008258 dated Jun. 4, 2020, and English translation, 13 pages.
Wu, Xiaoliang et al., "AXL kinase as a novel target for cancer therapy", Oncotarget, Oct. 16, 2014, vol. 20, No. 5, pp. 9546-9563, 18 pages.
Yamada et al., IL-1 Induced Chemokine Production Through the Association of Syk with TNF Receptor-Associated Factor-6 in Nasal Fibroblast Lines, Journal of Immunology, Jul. 1, 2001, pp. 283-288.
Zhao et al., "The regulation of MDM2 oncogene and its impact on human cancers". Acta Biochim Biophys Sin. Mar. 1, 2014; 46(3): 180-189.
Daver, N., et al., "Targeting FLT3 Mutations in AML: Review of Current Knowledge and Evidence," Leukemia (Jan. 16, 2019); 33(2): 299-312. Epub Jan. 16, 2019.
Extended European Search Report for European Application No. 20759712.1 dated Nov. 4, 2022, 10 pages.
Chang, E. et al., "The combination of FLT3 and DNA methyltransferase inhibition is synergistically cytotoxic to FLT3/ITD acute myeloid leukemia cells". Leukemia, Dec. 21, 2015, vol. 30, No. 5, pp. 1025-1032.
Ueno, Y. et al., "Gilteritinib (ASP2215), a Novel FLT3/AXL Inhibitor: Preclinical Evaluation in Combination with Azacitidine in Acute Myeloid Leukemia". Blood, Dec. 2, 2016, vol. 128, No. 22, p. 2830, 4 pages.
Wu, M. et al., "FLT3 inhibitors in acute myeloid leukemia". Journal of Hematology & Oncology, Dec. 4, 2018, vol. 11, No. 1, Article No. 133, 11 pages.
Edwards, D., et al., "CPX-351 works synergistically in combination with FLT3 inhibitors against AML with FLT3-ITD", Cancer Research Jul. 2017; vol. 77, No. Suppl. 13, p. 1087, & Annual Meeting of the American Association for Cancer Research (AACR); Washington, DC, USA; Apr. 1-5, 2017, 2 pages.
Extended European Search Report for European Application No. EP20200833623 dated Jun. 5, 2023, 9 pages.

(56) References Cited

OTHER PUBLICATIONS

Schittenhelm, M., et al., "The FLT3 I-15 inhibitor tandutinib (formerly MLN518) has sequence-independent synergistic effects with cytarabine and daunorubicin", Cell Cycle. Aug. 15, 2009; 8(16): 2621-2630. Epub Aug. 24, 2009.
International Search Report and Written Opinion for International Patent Application No. PCT/KR2020/013188 dated Jan. 6, 2021, and English translation, 24 pages.
Brinton, L.T. et al., "Synergistic effect of BCL2 and FLT3 co-inhibition in acute myeloid leukemia", J Hematol Oncol, 2020;13:139, 10 pages; doi:10.1186/s13045-020-00973-4.
Edwards et al., "Effective Combination of CPX/351 with FLT3 Inhibitors in AML Blasts Harboring the FLT3-ITD Mutation", Blood, Dec. 2, 2016; 128(22):5124, 2 pages.
Extended European Search Report for European Patent Application No. 21889548.0 dated Sep. 12, 2024, 9 pages.
International Preliminary Report on Patentability for International Application No. PCT/KR2022/016095, including Notification of Transmittal, mailed May 2, 2024; 8 pages.
International Preliminary Report on Patentability for International Patent Application No. PCT/KR2019/001737, with Notification of Transmittal, mailed Feb. 4, 2021, 9 pages.
International Search Report and Written Opinion for International Application No. PCT/KR2022/016095, with Notification of Transmittal, mailed Jan. 27, 2023, 12 pages.
International Search Report and Written Opinion for International Application No. PCT/US2023/083227, with Notification of Transmittal, mailed Apr. 2, 2024, 13 pages.
International Search Report and Written Opinion for PCT Application No. PCT/KR2023/017598, including Notification of Transmittal, mailed Feb. 14, 2024, 16 pages.
International Search Report and Written Opinion for PCT Application No. PCT/KR2024/007424, with Notification of Transmittal, mailed Sep. 11, 2024, 16 pages.
Invitation to Pay Additional Fees for International Application No. PCT/US2023/083227, mailed Feb. 13, 2024; 3 pages.
Luppi, Mario, et al., "Novel Agents for Acute Myeloid Leukemia", Cancers, Nov. 9, 2018; 10(11):429, 18 pages.
Zhu, R. et al., "FLT3 tyrosine kinase inhibitors synergize with BCL-2 inhibition to eliminate FLT3/ITD acute leukemia cells through BIM activation", Signal Transduction and Targeted Therapy, 2021, [Epub] May 24, 2021; 6:186, doi10.1038/s41392-021-00578-4; 11 pages.
Wu, M. et al., "Current status of treatment and research progress of new drugs for adult acute myeloid leukemia", Pharmaceutical and Clinical Research, Aug. 15, 2018;4:281-286 (Chinese with English abstract on p. 286).

\* cited by examiner

PHARMACEUTICAL COMPOSITION COMPRISING FLT3 INHIBITOR AND HYPOMETHYLATING AGENT FOR TREATING ACUTE MYELOID LEUKEMIA

CROSS REFERENCE TO RELATED APPLICATIONS

This application is a National Stage of International Application No. PCT/KR2020/002536 filed Feb. 21, 2020, claiming priority based on Korean Patent Application No. 10-2019-0021228, filed Feb. 22, 2019 and Korean Patent Application No. 10-2020-0021502 filed Feb. 21, 2020.

TECHNICAL FIELD

The present disclosure relates to a pharmaceutical composition for treating acute myeloid leukemia, the pharmaceutical composition comprising a therapeutically effective combination of an Fms-like tyrosine kinase (Fms-like tyrosine kinase-3: FLT3) inhibitor and a hypomethylating agent (HMA), and a method of treating acute myeloid leukemia using the same.

BACKGROUND ART

Fms-like tyrosine kinase (Fms-like tyrosine kinase-3: FLT3) is one of the most frequently mutated genes in acute myeloid leukemia (AML). Mutant FLT3 refers to a mutant expressed in the leukemic cells of a subpopulation of AML patients. Activating mutations in FLT3, such as internal tandem duplication (ITD) in the juxtamembrane domain, occur in approximately 25% to approximately 30% of newly diagnosed AML cases (Patent Document 1). FLT3 mutations are known to occur in about one-third of patients with AML (Non-Patent Document 1).

There are several FLT3 inhibitors clinically applicable, but drug-resistant leukocytes were observed in AML patients treated with these FLT3 inhibitors and they showed drug resistance (Non-Patent Document 1). In addition, it is impossible to target AML stem/progenitor cells by a traditional AML standard chemotherapy, and thus recurrence is frequent in patients. Accordingly, there is a problem in that long-term efficacy is limited (Non-Patent Document 2). Therefore, there is a need for a method capable of effectively treating patients with mutant acute leukemia.

There has been an attempt to solve resistance to FLT3 inhibitors, in which administration of FLT3 inhibitors was studied by use of FLT3 inhibitors in combination with inhibitors of PI3K/Akt, MAPK and JAK/STAT signaling pathways (Non-Patent Document 3). Inhibitor of apoptosis protein (IAP) inhibitor refers to a protein that plays a role in mediating apoptosis, and these proteins are expressed in various ways in acute leukemia, and known to be involved in chemosensitivity, chemoresistance, disease progression, remission, and patient survival (Non-Patent Document 3). Use of IAP inhibitors in combination with FLT3 inhibitors has been studied for the treatment of AML and hematologic malignancies (Patent Document 2).

A hypomethylating agent (demethylating agent) refers to a drug that causes hypomethylation of DNA, and includes azacitidine, decitabine, idarubicin, etc. For example, decitabine is clinically used in primary and secondary myelodysplastic syndromes (MDS), etc. Azacitidine is a drug referred as the chemical name of "4-amino-1-β-D-ribofuranosyl-1,3,5-triazin-2(1H)-one" and is marketed under the trade name Vidaza. Azacitidine is known as a nucleoside metabolic inhibitor (hypomethylating agent) for the treatment of patients with FAB MDS subtypes.

PRIOR ART DOCUMENTS

[Patent Document 1] Korean Patent Publication No. 10-2018-0124055
[Patent Document 2] Korean Patent Publication No. 10-2009-0087094
[Non-Patent Document 1] Mol Cancer Ther 2007; 6(7). Jul. 2007
[Non-Patent Document 2] J Natl Cancer Inst. Vol. 106, Issue 2, djt440, Feb. 5, 2014
[Non-Patent Document 3] Oncogene. 2010 Sep. 16; 29(37):5120-34

DESCRIPTION OF EMBODIMENTS

Technical Problem

The present disclosure provides an alternative therapy for treating acute myeloid leukemia (AML) patients with mutant FLT3, leading to better therapeutic outcomes.

Solution to Problem

FLT3 is a promising therapeutic target for leukemia, and FLT3 mutation occurs in approximately 30% or more of acute myeloid leukemia (AML) patients. However, there is a growing interest in the development of drug resistance and refractories resulting from emergence of point mutations in targeted tyrosine kinases used for the treatment of AML. One approach to overcoming this resistance is identified by determining whether efficacy and therapeutic effects are enhanced by using structurally unrelated inhibitors and/or inhibitors of different signaling pathways in combination.

An aspect of the present disclosure provides a pharmaceutical composition for treating acute myeloid leukemia (AML), the pharmaceutical composition comprising an Fms-like tyrosine kinase (Fms-like tyrosine kinase-3: FLT3) inhibitor or a pharmaceutically acceptable salt or solvate thereof, which is administered in combination with a hypomethylating agent (HMA) or a pharmaceutically acceptable salt or solvate thereof, wherein the FLT3 inhibitor is a compound selected from a compound of Chemical Formula 1, a stereoisomer thereof, a tautomer thereof, and a combination thereof.

Another aspect of the present disclosure provides a pharmaceutical kit, wherein the pharmaceutical composition is administered simultaneously, sequentially, in reverse order, or individually.

Still another aspect of the present disclosure provides a pharmaceutical composition for treating AML, the pharmaceutical composition comprising an HMA or a pharmaceutically acceptable salt or solvate thereof, which is administered in combination with an FLT3 inhibitor or a pharmaceutically acceptable salt or solvate thereof.

Advantageous Effects of Disclosure

An aspect of the present disclosure provides a pharmaceutical composition comprising an Fms-like tyrosine kinase (FLT3) inhibitor and a hypomethylating agent (HMA), and a kit or a combination, each including the composition.

Another aspect of the present disclosure provides a method of treating hematologic malignant tumors including acute myeloid leukemia (AML) using the pharmaceutical composition, kit, or combination, and use thereof in the treatment of AML.

Still another aspect of the present disclosure provides the pharmaceutical composition, kit, or combination, thereby enhancing therapeutic effects on AML patients with FLT3 mutant.

MODE OF DISCLOSURE

Figure 1:
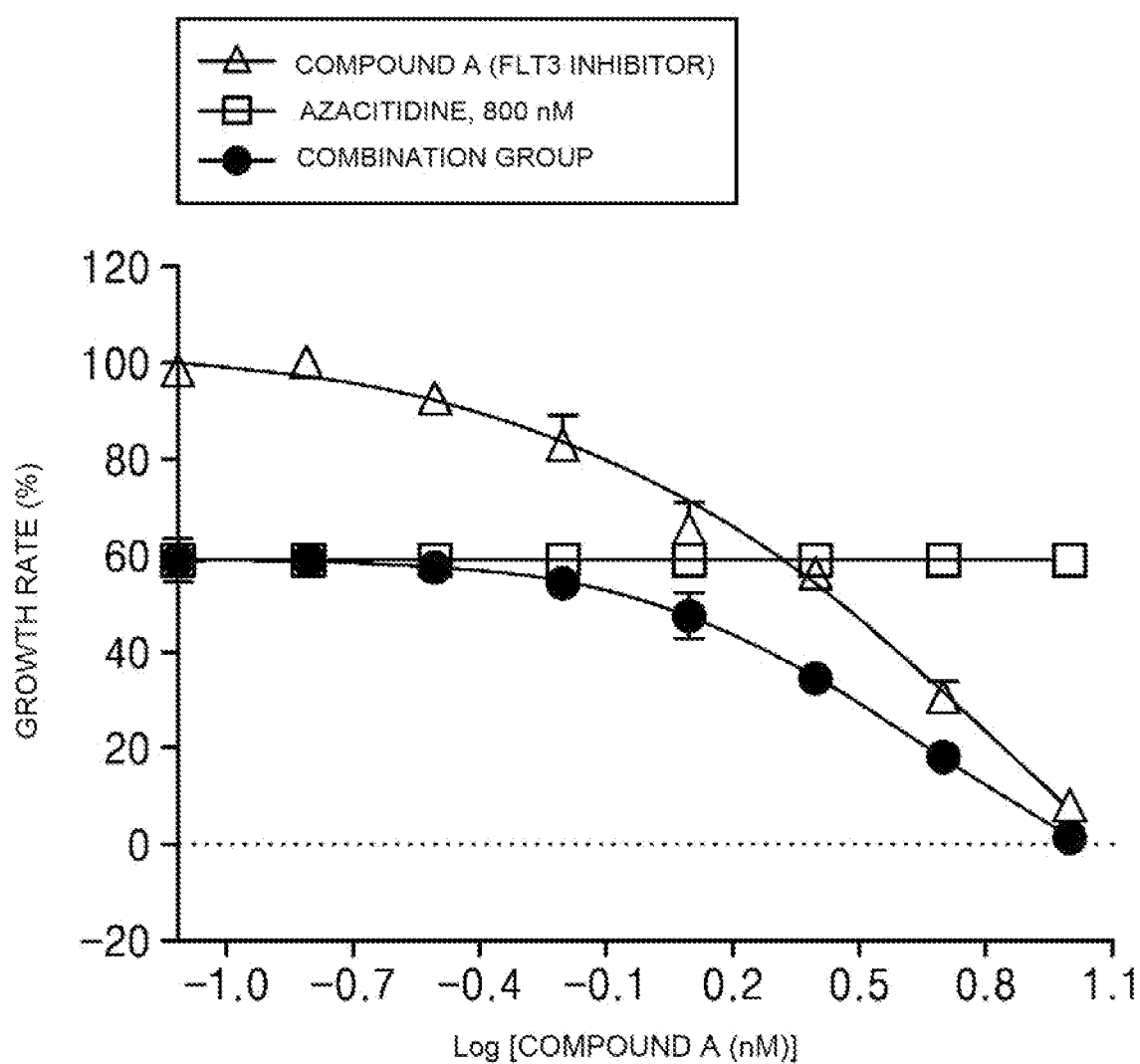
FIG. 1 shows inhibition of MOLM-13 cell growth by treatment with Compound A and azacitidine in combination, wherein the Y-axis represents a cell growth rate (%) and the X-axis represents a logarithmic concentration of Compound A (a logarithmic value of a unit concentration in nM)

Unless defined otherwise, all technical terms used herein have the same meanings as those generally understood by one of ordinary skill in the art to which the present disclosure belongs. Further, although methods or samples are described herein, those similar or equivalent thereto are also incorporated in the scope of the present disclosure. The numerical values described herein are considered to include the meaning of "about", unless otherwise specified. The contents of all the publications disclosed as references herein are incorporated in the present disclosure.

An aspect of the present disclosure provides a method, use, a combination, a kit, and a composition, each for the treatment of acute myeloid leukemia (AML), comprising an Fms-like tyrosine kinase (Fms-like tyrosine kinase-3: FLT3) inhibitor or a pharmaceutically acceptable salt or solvate thereof, and a hypomethylating agent (HMA) or a pharmaceutically acceptable salt or solvate thereof in combination effective for the treatment of AML.

As used herein, the AML includes AML with FLT3 mutation. In one specific embodiment, the AML includes mutant FLT3 polynucleotide-positive AML, FLT3 internal tandem duplication (ITD)-positive AML, or AML with FLT3 point mutations.

FLT3 is a member of the class III receptor tyrosine kinase (TK) family commonly expressed on the surface of hematopoietic stem cells. FLT3 and ligands thereof play an important role in proliferation, survival, and differentiation of pluripotent stem cells. FLT3 is expressed in many AML cases. Further, tyrosine kinase domain (TKD) mutations near D835 in activated FLT3 and activation loops with internal tandem duplication (ITD) in and around the juxtamembrane domain are found in 28% to 34% and 11% to 14% of AML cases, respectively. These activating mutations in FLT3 are tumorigenic and exhibit transforming activity in cells. Patients with FLT3-ITD mutation show poor prognosis in clinical studies, a higher relapse rate, a shorter duration of remission from initial therapy (6 months vs 11.5 months for those without FLT3-ITD mutations), as well as reduced disease-free survival (16% to 27% vs 41% at 5 years) and overall survival (OS) (15% to 31% vs 42% at 5 years). Recurrence after hematopoietic stem cell transplantation (HSCT) is also higher in FLT3-ITD patients (30% vs 16% for those without FLT3-ITD mutations at 2 years). Similar to the prognosis for first-line treatment, salvage chemotherapy on relapsed/refractory FLT3 mutation-positive AML patients shows a lower rate of remission, a shorter duration of remission to second-line relapse, and reduced OS, as compared to FLT3 mutation-negative patients.

As used herein, the FLT3 inhibitor includes materials such as 4'-N-benzoyl staurosporine (ingredient name: midostaurin), 6-ethyl-3-[[3-methoxy-4-[4-(4-methyl-1-piperazinyl)-1-piperidinyl]phenyl]amino]-5-[(tetrahydro-2H-pyran-4-yl)amino]-2-pyrazinecarboxamide (ingredient name: gilteritinib), 1-(2-{5-[(3-methyloxetan-3-yl)methoxy]-1H-benzimidazol-1-yl}quinolin-8-yl)piperidin-4-amine (ingredient name: Crenolanib), 1-(5-(tert-butyl)isoxazol-3-yl)-3-(4-(7-(2-morpholinoethoxy)benzo[d]imidazo[2,1-b]thiazol-2-yl)phenyl)urea (ingredient name: quizartinib), 2-hydroxy-1-(2-((9-((1r,4r)-4-methylcyclohexyl)-9H-pyrido[4',3':4,5]pyrrolo[2,3-d]pyrimidin-2-yl)amino)-7,8-dihydro-1,6-naphthyridin-6(5H)-yl)ethanone (FLX925), (S,E)-N-(1-((5-(2-((4-cyanophenyl)amino)-4-(propylamino)pyrimidin-5-yl)pent-4-yn-1-yl)amino)-1-oxopropan-2-yl)-4-(dimethylamino)-N-methylbut-2-enamide (FF-10101), 6-[[(1R,2S)-2-aminocyclohexyl]amino]-7-fluoro-4-(1-methylpyrazol-4-yl)-1,2-dihydropyrrolo[3,4-c]pyridin-3-one (TAK-659), etc., compounds having kinase inhibitory activity described in International Patent Application No. WO2018-139903 or compounds having FLT3 inhibitory activity described in Korean Patent Application No. 10-2018-0086768, or FLT3 inhibitors in the form of any pharmaceutically acceptable salt or hydrate thereof, but is not limited thereto.

In one specific embodiment, the FLT3 inhibitor may be a compound having kinase inhibitory activity described in International Patent Application No. WO2018-139903 or a compound having FLT3 inhibitory activity described in Korean Patent Application No. 10-2018-0086768, any pharmaceutically acceptable salt or hydrate thereof.

An aspect of the present disclosure provides a pharmaceutical composition for treating AML, the pharmaceutical composition comprising an FLT3 inhibitor or a pharmaceutically acceptable salt or solvate thereof, which is administered in combination with an HMA or a pharmaceutically acceptable salt or solvate thereof, wherein the FLT3 inhibitor is a compound selected from a compound of Chemical Formula 1, a stereoisomer thereof, a tautomer thereof, and a combination thereof.

[Chemical Formula 1]

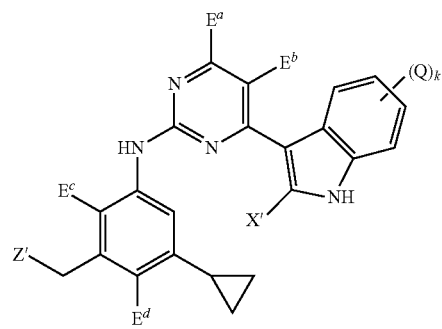

in Chemical Formula 1,
$E^a$ is hydrogen, hydroxy, or $C_{1-4}$ alkoxy;
$E^b$ is hydrogen, halogen, $C_{1-4}$ alkyl, or $C_{1-4}$ fluoroalkyl;
$E^c$ and $E^d$ are each independently hydrogen or hydroxy;
X is hydrogen or hydroxy;
k is an integer of 1 to 2;
respective Q's are each independently hydroxy, halogen, $C_{1-4}$ alkyl, hydroxy $C_{1-4}$ alkyl, or $C_{1-4}$ alkoxy; and
Z' is a monovalent functional group represented by Chemical Formula 2;

[Chemical Formula 2]

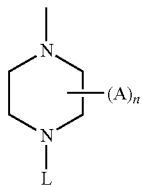

in Chemical Formula 2, n is an integer of 1 to 2;
respective A's are each independently a functional group selected from hydroxy, $C_{1-4}$ alkyl, and hydroxy $C_{1-4}$ alkyl, wherein at least one A is $C_{1-4}$ alkyl; and
L is hydrogen, $C_{1-4}$ alkyl, hydroxy, or hydroxy $C_{1-4}$ alkyl.

As used herein, the term "solvate" refers to a molecular complex of the compound of the present disclosure (or a pharmaceutically acceptable salt thereof) and one or more solvent molecules. Such solvent molecules are those known or commonly used in the pharmaceutical art, e.g., water, ethanol, etc. The term "hydrate" refers to a complex where the solvent molecule is water.

As used herein, the term "salt" or "pharmaceutically acceptable salt" refers to a pharmaceutically acceptable derivative of the disclosed compound, wherein a parent compound is modified by converting an existing acid or base moiety to a salt form thereof.

In one specific embodiment, the FLT3 inhibitor may be a compound selected from a compound of the following Chemical Formula 3, a stereoisomer thereof, a tautomer thereof, and a combination thereof.

[Chemical Formula 3]

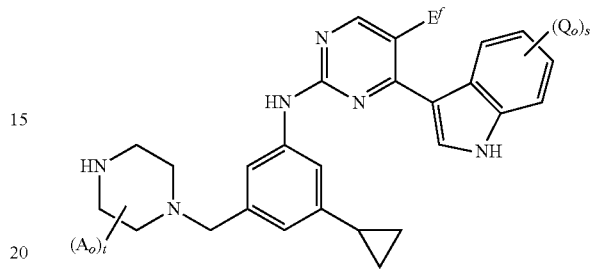

in Chemical Formula 3,
$E^f$ is fluorine, chlorine, bromine, or iodine;
$Q_o$ is hydroxy, halogen, $C_{1-4}$ alkyl, hydroxy $C_{1-4}$ alkyl, or $C_{1-4}$ alkoxy;
s is an integer of 1 to 2;
$A_o$ is a functional group selected from hydroxy, $C_{1-4}$ alkyl, and hydroxy $C_{1-4}$ alkyl; and t is an integer of 1 to 2.

The FLT3 inhibitor may be, for example, a compound having kinase inhibitory activity described in International Patent Application No. WO2018-139903, for example, a compound selected from the group consisting of compounds listed in No. 1 to No. 55 in Table 1 below, or a compound selected from the group consisting of any pharmaceutically acceptable salts or hydrates thereof.

TABLE 1

| No. | Compound name |
|---|---|
| 1 | 2-(4-(3-((5-chloro-4-(6-fluoro-1H-indol-3-yl)pyrimidin-2-yl)amino)-5-cyclopropylphenyl)piperazin-1-yl)ethan-1-ol |
| 2 | 2-(4-(3-((5-chloro-4-(6-methyl-1H-indol-3-yl)pyrimidin-2yl)amino)-5-cyclopropylphenyl)piperazin-1-yl)ethan-1-ol |
| 3 | 5-chloro-N-(3-cyclopropyl-5-(4-(dimethylamino)piperidin-1-yl)phenyl)-4-(1H-indol-3-yl)pyrimidin-2-amine |
| 4 | (S)-1-((1-(3-((5-chloro-4-(1H-indol-3-yl)pyrimidin-2-yl)amino)-5-cyclopropylphenyl)piperidin-4-yl)(methyl)amino)propan-2-ol |
| 5 | (S)-1-((1-(3-((5-chloro-4-(6-methyl-1H-indol-3-yl)pyrimidin-2-yl)amino)-5-cyclopropylphenyl)piperidin-4-yl)(methyl)amino)propan-2-ol |
| 6 | 5-chloro-N-(3-cyclopropyl-5-(4-(dimethylamino)piperidin-1-yl)phenyl)-4-(6-methyl-1H-indol-3-yl)pyrimidin-2-amine |
| 7 | 2-(4-(3-((5-chloro-4-(6-methoxy-1H-indol-3-yl)pyrimidin-2-yl)amino)-5-cyclopropylphenyl)piperazin-1-yl)ethan-1-ol |
| 8 | (S)-1-(1-(3-((5-chloro-4-(1H-indol-3-yl)pyrimidin-2-yl)amino)-5-cyclopropylphenyl)piperidin-4-yl)pyrrolidin-3-ol |
| 9 | (S)-1-(1-(3-((5-chloro-4-(6-methyl-1H-indol-3-yl)pyrimidin-2-yl)amino)-5-cyclopropylphenyl)piperidin-4-yl)pyrrolidin-3-ol |
| 10 | 5-chloro-N-(3-cyclopropyl-5-(4-(dimethylamino)piperidin-1-yl)phenyl)-4-(6-methoxy-1H-indol-3-yl)pyrimidin-2-amine |
| 11 | (S)-1-(1-(3-((5-chloro-4-(6-methoxy-1H-indol-3-yl)pyrimidin-2-yl)amino)-5-cyclopropylphenyl)piperidin-4-yl)pyrrolidin-3-ol |
| 12 | 2-(4-(3-((4-(1H-indol-3-yl)-5-methylpyrimidin-2-yl)amino)-5-cyclopropylphenyl)piperazin-1-yl)ethan-1-ol |
| 13 | 5-chloro-N-(3-cyclopropyl-5-(4-morpholinopiperidin-1-yl)phenyl)-4-(6-methyl-1H-indol-3-yl)pyrimidin-2-amine |
| 14 | 5-chloro-N-(3-cyclopropyl-5-(4-(ethyl(methyl)amino)piperidin-1-yl)phenyl)-4-(6-methyl-1H-indol-3-yl)pyrimidin-2-amine |
| 15 | 5-chloro-N-(3-cyclopropyl-5-(4-(diethylamino)piperidin-1-yl)phenyl)-4-(6-methyl-1H-indol-3-yl)pyrimidin-2-amine |
| 16 | 5-chloro-N-(3-cyclopropyl-5-(3-(dimethylamino)pyrrolidin-1-yl)phenyl)-4-(6-methyl-1H-indol-3-yl)pyrimidin-2-amine |

TABLE 1-continued

| No. | Compound name |
|---|---|
| 17 | 2-(4-(3-((5-chloro-4-(6-methyl-1H-indol-3-yl)pyrimidin-2-yl)amino)-5-cyclopropylphenyl)piperazin-1-yl)-2-methylpropan-1-ol |
| 18 | N-(3-(4-aminopiperidin-1-yl)-5-cyclopropylphenyl)-5-chloro-4-(6-methyl-1H-indol-3-yl)pyrimidin-2-amine |
| 19 | 5-chloro-N-(3-cyclopropyl-5-(4-(methylamino)piperidin-1-yl)phenyl)-4-(6-methyl-1H-indol-3-yl)pyrimidin-2-amine |
| 20 | 2-(4-(3-((5-chloro-4-(6-fluoro-1H-indol-3-yl)pyrimidin-2-yl)amino)-5-cyclopropylphenyl)piperazin-1-yl)-2-methylpropan-1-ol |
| 21 | 2-(4-(3-((5-chloro-4-(6-methyl-1H-indol-3-yl)pyrimidin-2-yl)amino)-5-cyclopropylphenyl)piperidin-1-yl)ethan-1-ol |
| 22 | 2-(4-(3-((5-chloro-4-(6-chloro-1H-indol-3-yl)pyrimidin-2-yl)amino)-5-cyclopropylphenyl)piperazin-1-yl)ethan-1-ol |
| 23 | 5-chloro-N-(3-cyclopropyl-5-(4-(pyrrolidin-1-yl)piperidin-1-yl)phenyl)-4-(6-methyl-1H-indol-3-yl)pyrimidin-2-amine |
| 24 | 1-(1-(3-((5-chloro-4-(6-methyl-1H-indol-3-yl)pyrimidin-2-yl)amino)-5-cyclopropylphenyl)piperidin-4-yl)azetidin-3-ol |
| 25 | 2-(4-(3-((5-chloro-4-(1H-indol-3-yl)pyrimidin-2-yl)amino)-5-methoxyphenyl)piperazin-1-yl)ethan-1-ol |
| 26 | 2-(4-(3-((5-chloro-4-(6-fluoro-1H-indol-3-yl)pyrimidin-2-yl)amino)phenyl)piperazin-1-yl)ethan-1-ol |
| 27 | 2-(4-(3-((5-chloro-4-(1H-indol-3-yl)pyrimidin-2yl)amino)phenyl)piperidin-1-yl)ethan-1-ol |
| 28 | 2-(4-(3-((5-chloro-4-(1H-indol-3-yl)pyrimidin-2-yl)amino)phenyl) piperazin-1-yl)ethan-1-ol |
| 29 | 5-chloro-N-(3-(4-(dimethylamino)piperidin-1-yl)phenyl)-4-(1H-indol-3-yl)pyrimidin-2-amine |
| 30 | 5-chloro-N-(3-(3-(dimethylamino)pyrrolidin-1-yl)phenyl)-4-(1H-indol-3-yl)pyrimidin-2-amine |
| 31 | 2-(4-(3-((5-chloro-4-(6-fluoro-1H-indol-3-yl)pyrimidin-2-yl)amino)-5-methoxyphenyl)piperazin-1-yl)ethan-1-ol |
| 32 | 2-(4-(3-((5-chloro-4-(1H-indol-3-yl)pyrimidin-2-yl)amino)-5-isopropoxyphenyl)piperazin-1-yl)ethan-1-ol |
| 33 | 2-(4-(3-((5-chloro-4-(6-fluoro-1H-indol-3-yl)pyrimidin-2-yl)amino)-5-isopropoxyphenyl)piperazin-1-yl)ethan-1-ol |
| 34 | 5-chloro-N-(3-cyclopropyl-5-(piperazin-1-ylmethyl)phenyl)-4-(6-fluoro-1H-indol-3-yl)pyrimidin-2-amine |
| 35 | 2-(4-(3-((5-chloro-4-(6-fluoro-1H-indol-3-yl)pyrimidin-2-yl)amino)-5-methoxybenzyl)piperazin-1-yl)ethan-1-ol |
| 36 | 2-(4-(3-((5-chloro-4-(6-fluoro-1H-indol-3-yl)pyrimidin-2-yl)amino)benzyl)piperazin-1-yl)ethan-1-ol |
| 37 | 2-(4-(3-((5-chloro-4-(1H-indol-3-yl)pyrimidin-2-yl)amino)-5-methoxybenzyl)piperazin-1-yl)ethan-1-ol |
| 38 | 2-(4-(3-((5-chloro-4-(1H-indol-3-yl)pyrimidin-2-yl)amino)-5-cyclopropylbenzyl)piperazin-1-yl)-2-methylpropan-1-ol |
| 39 | (S)-1-((1-(3-((5-chloro-4-(1H-indol-3-yl)pyrimidin-2-yl)amino)-5-cyclopropylbenzyl)piperidin-4-yl)(methyl)amino)propan-2-ol |
| 40 | (S)-1-((1-(3-((5-chloro-4-(6-methyl-1H-indol-3-yl)pyrimidin-2-yl)amino)-5-cyclopropylbenzyl)piperidin-4-yl)(methyl)amino)propan-2-ol |
| 41 | 2-(4-(3-((5-chloro-4-(6-methyl-1H-indol-3-yl)pyrimidin-2-yl)amino)-5-cyclopropylbenzyl)piperazin-1-yl)-2-methylpropan-1-ol |
| 42 | (S)-1-(1-(3-((5-chloro-4-(1H-indol-3-yl)pyrimidin-2-yl)amino)-5-cyclopropylbenzyl)piperidin-4-yl)pyrrolidin-3-ol |
| 43 | (S)-1-(1-(3-((5-chloro-4-(6-methyl-1H-indol-3-yl)pyrimidin-2-yl)amino)-5-cyclopropylbenzyl)piperidin-4-yl)pyrrolidin-3-ol |
| 44 | (S)-1-(1-(3-((5-chloro-4-(6-methoxy-1H-indol-3-yl)pyrimidin-2-yl)amino)-5-cyclopropylbenzyl)piperidin-4-yl)pyrrolidin-3-ol |
| 45 | 1-(3-((5-chloro-4-(6-methyl-1H-indol-3-yl)pyrimidin-2-yl)amino)-5-cyclopropylbenzyl)piperidin-4-ol |
| 46 | (S)-5-chloro-N-(3-cyclopropyl-5-((3-(dimethylamino)pyrrolidin-1-yl)methyl)phenyl)-4-(6-methyl-1H-indol-3-yl)pyrimidin-2-amine |
| 47 | 1-(4-(3-((5-chloro-4-(6-fluoro-1H-indol-3-yl)pyrimidin-2-yl)amino)-5-cyclopropylbenzyl)piperazin-1-yl)-2-hydroxyethan-1-one |
| 48 | 1-(4-(3-((5-chloro-4-(6-methyl-1H-indol-3-yl)pyrimidin-2-yl)amino)-5-cyclopropylbenzyl)piperazin-1-yl)-2-hydroxyethan-1-one |
| 49 | 2-(4-(3-((5-chloro-4-(6-ethyl-1H-indol-3-yl)pyrimidin-2-yl)amino)-5-cyclopropylbenzyl)piperazin-1-yl)ethan-1-ol |
| 50 | (3-((5-chloro-4-(1H-indol-3-yl)pyrimidin-2-yl)amino)-5-methoxyphenyl)(4-(2-hydroxyethyl)piperazin-1-yl)methanone |
| 51 | 1-(2-(3-((5-chloro-4-(6-methyl-1H-indol-3-yl)pyrimidin-2-yl)amino)-5-cyclopropylphenoxy)ethyl)piperidin-4-ol |
| 52 | 1-(2-(3-((5-chloro-4-(6-methyl-1H-indol-3-yl)pyrimidin-2-yl)amino-5-ethylphenoxy)ethyl)piperidin-4-ol |
| 53 | (R)-2-(3-(3-((5-chloro-4-(6-methyl-1H-indol-3-yl)pyrimidin-2-yl)amino)-5-cyclopropylphenoxy)pyrrolidin-1-yl)ethan-1-ol |

TABLE 1-continued

| No. | Compound name |
|---|---|
| 54 | 2-(4-(3-((5-chloro-4-(6-methyl-1H-indol-3-yl)pyrimidin-2-yl)amino)-5-cyclopropylphenoxy)piperidin-1-yl)ethan-1-ol |
| 55 | 2-(4-(3-((5-chloro-4-(1H-indol-3-yl)pyrimidin-2-yl)amino)-5-methoxyphenoxy)piperidin-1-yl)ethan-1-ol |

The FLT3 inhibitor may be, for example, a compound having FLT3 inhibitory activity described in Korean Patent Application No. 10-2018-0086768, for example, a compound selected from the group consisting of compounds listed in No. 1 to No. 32 in Table 2 below, or a compound selected from the group consisting of any pharmaceutically acceptable salts or hydrates thereof.

TABLE 2

| No. | Compound name |
|---|---|
| 1 | 5-chloro-N-(3-cyclopropyl-5-(((3R,5S)-3,5-dimethylpiperazin-1-yl)methyl)phenyl)-4-(6-fluoro-1H-indol-3-yl)pyrimidin-2-amine |
| 2 | 5-chloro-4-(6-chloro-1H-indol-3-yl)-N-(3-cyclopropyl-5-(((3R,5S)-3,5-dimethylpiperazin-1-yl)methyl)phenyl)pyrimidin-2-amine |
| 3 | 2-((2R,6S)-4-(3-((5-chloro-4-(6-fluoro-1H-indol-3-yl)pyrimidin-2-yl)amino)-5-cyclopropylbenzyl)-2,6-dimethylpiperazin-1-yl)ethan-1-ol |
| 4 | 2-((2R,6S)-4-(3-((5-chloro-4-(1H-indol-3-yl)pyrimidin-2-yl)amino)-5-cyclopropylbenzyl)-2,6-dimethylpiperazin-1-yl)ethan-1-ol |
| 5 | 2-((2R,6S)-4-(3-((5-chloro-4-(6-methyl-1H-indol-3-yl)pyrimidin-2-yl)amino)-5-cyclopropylbenzyl)-2,6-dimethylpiperazin-1-yl)ethan-1-ol |
| 6 | (R)-5-chloro-N-(3-cyclopropyl-5-((3-methylpiperazin-1-yl)methyl)phenyl)-4-(1H-indol-3-yl)pyrimidin-2-amine |
| 7 | (R)-5-chloro-N-(3-cyclopropyl-5-((3-methylpiperazin-1-yl)methyl)phenyl)-4-(6-methyl-1H-indol-3-yl)pyrimidin-2-amine |
| 8 | 5-chloro-N-(3-cyclopropyl-5-(((3R,5S)-3,5-dimethylpiperazin-1-yl)methyl)phenyl)-4-(6-methyl-1H-indol-3-yl)pyrimidin-2-amine |
| 9 | 5-chloro-N-(3-cyclopropyl-5-(((3S,5R)-3-ethyl-5-methylpiperazin-1-yl)methyl)phenyl)-4-(6-methyl-1H-indol-3-yl)pyrimidin-2-amine |
| 10 | 5-chloro-N-(3-cyclopropyl-5-((3,5-dimethylpiperazin-1-yl)methyl)phenyl)-4-(6-methyl-1H-indol-3-yl)pyrimidin-2-amine |
| 11 | N-(3-cyclopropyl-5-(((3R,5S)-3,5-dimethylpiperazin-1-yl)methyl)phenyl)-4-(6-methyl-1H-indol-3-yl)pyrimidin-2-amine |
| 12 | N-(3-cyclopropyl-5-(((3R,5S)-3,5-dimethylpiperazin-1-yl)methyl)phenyl)-5-fluoro-4-(6-methyl-1H-indol-3-yl)pyrimidin-2-amine |
| 13 | N-(3-cyclopropyl-5-(((3R,5S)-3,5-dimethylpiperazin-1-yl)methyl)phenyl)-4-(1H-indol-3-yl)-5-methylpyrimidin-2-amine |
| 14 | N-(3-cyclopropyl-5-(((3R,5S)-3,5-dimethylpiperazin-1-yl)methyl)phenyl)-5-methyl-4-(6-methyl-1H-indol-3-yl)pyrimidin-2-amine |
| 15 | N-(3-cyclopropyl-5-(((3R,5S)-3,5-dimethylpiperazin-1-yl)methyl)phenyl)-4-(6-methyl-1H-indol-3-yl)-5-(trifluoromethyl)pyrimidin-2-amine |
| 16 | (3-(5-chloro-2-((3-cyclopropyl-5-(((3R,5S)-3,5-dimethylpiperazin-1-yl)methyl)phenyl)amino)pyrimidin-4-yl)-1H-indol-6-yl)methanol |
| 17 | 5-chloro-N-(3-cyclopropyl-5-(((3R,5S)-3,5-dimethylpiperazin-1-yl)methyl)phenyl)-4-(5-methoxy-6-methyl-1H-indol-3-yl)pyrimidin-2-amine |
| 18 | 3-(5-chloro-2-((3-cyclopropyl-5-(((3R,5S)-3,5-dimethylpiperazin-1-yl)methyl)phenyl)amino)pyrimidin-4-yl)-6-methyl-1H-indol-5-ol |
| 19 | 3-(5-chloro-2-((3-cyclopropyl-5-(((3R,5S)-3,5-dimethylpiperazin-1-yl)methyl)phenyl)amino)pyrimidin-4-yl)-6-methylindolin-2-one |
| 20 | 5-chloro-N-(3-cyclopropyl-5-(((3R,5S)-3,5-dimethylpiperazin-1-yl)methyl)phenyl)-4-methoxy-6-(6-methyl-1H-indol-3-yl)pyrimidin-2-amine |
| 21 | 5-chloro-2-((3-cyclopropyl-5-(((3R,5S)-3,5-dimethylpiperazin-1-yl)methyl)phenyl)amino)-6-(6-methyl-1H-indol-3-yl)pyrimidin-4-ol |
| 22 | 3-(5-chloro-2-((3-cyclopropyl-5-(((3R,5S)-3,5-dimethylpiperazin-1-yl)methyl)phenyl)amino)pyrimidin-4-yl)-6-methyl-1H-indol-7-ol |
| 23 | 2-((5-chloro-4-(6-methyl-1H-indol-3-yl)pyrimidin-2-yl)amino)-4-cyclopropyl-6-(((3R,5S)-3,5-dimethylpiperazin-1-yl)methyl)phenol |
| 24 | 4-((5-chloro-4-(6-methyl-1H-indol-3-yl)pyrimidin-2-yl)amino)-2-cyclopropyl-6-(((3R,5S)-3,5-dimethylpiperazin-1-yl)methyl)phenol |
| 25 | (R)-5-chloro-N-(3-cyclopropyl-5-((3,3,5-trimethylpiperazin-1-yl)methyl)phenyl)-4-(6-methyl-1H-indol-3-yl)pyrimidin-2-amine |
| 26 | ((2R,6R)-4-(3-((5-chloro-4-(6-methyl-1H-indol-3-yl)pyrimidin-2-yl)amino)-5-cyclopropylbenzyl)-6-methylpiperazin-2-yl)methanol |
| 27 | (R)-5-chloro-N-(3-cyclopropyl-5-((5-methyl-4,7-diazaspiro[2.5]octan-7-yl)methyl)phenyl)-4-(6-methyl-1H-indol-3-yl)pyrimidin-2-amine |
| 28 | 5-chloro-N-(3-cyclopropyl-5-(((3R,5R)-3,5-dimethylpiperazin-1-yl)methyl)phenyl)-4-(6-methyl-1H-indol-3-yl)pyrimidin-2-amine |
| 29 | 5-chloro-N-(3-cyclopropyl-5-(((3S,5S)-3,5-dimethylpiperazin-1-yl)methyl)phenyl)-4-(6-methyl-1H-indol-3-yl)pyrimidin-2-amine |
| 30 | 5-chloro-N-(3-cyclopropyl-5-(((3R,5S)-3,4,5-trimethylpiperazin-1-yl)methyl)phenyl)-4-(6-methyl-1H-indol-3-yl)pyrimidin-2-amine |

TABLE 2-continued

| No. | Compound name |
|---|---|
| 31 | (2R,6S)-4-(3-((5-chloro-4-(6-methyl-1H-indol-3-yl)pyrimidin-2-yl)amino)-5-cyclopropylbenzyl)-2,6-dimethylpiperazin-1-ol |
| 32 | (2R,6S)-4-(3-cyclopropyl-5-((4-(6-methyl-1H-indol-3-yl)pyrimidin-2-yl)amino)benzyl)-2,6-dimethylpiperazin-1-ol |

In one specific embodiment, the FLT3 inhibitor may be 5-chloro-N-(3-cyclopropyl-5-(((3R, 5S)-3,5-dimethylpiperazin-1-yl)methyl)phenyl)-4-(6-methyl-1H-indol-3-yl)pyrimidin-2-amine, or a pharmaceutically acceptable salt or hydrate thereof.

As used herein, the hypomethylating agent (HMA) refers to a substance for DNA hypomethylation or a DNA demethylating agent. DNA methylation is a major mechanism regulating gene expression in cells, and when DNA methylation is increased, activity of suppressor genes that regulate cell division and proliferation is blocked, and as a result, cell division is not controlled and cancer progresses. The hypomethylating agent may function, for example, as an antimetabolic agent that interferes with DNA methylation and restores tumor suppressor genes to regulate tumor growth, or has a structure similar to a substance required for tumor cell metabolism to interfere with cellular metabolism and to exhibit a tumor growth inhibitory action.

As used herein, the HMA may be, for example, a substance such as 4-amino-1-β-D-ribofuranosyl-1,3,5-triazin-2(1H)-one (ingredient name: azacitidine), 4-amino-1-((2R,4R,5R)-4-hydroxy-5-(hydroxymethyl)tetrahydrofuran-2-yl)-1,3,5-triazin-2(1H)-one (ingredient name: decitabine), etc., or an HMA in any pharmaceutically acceptable salt or hydrate form thereof, but is not limited thereto.

In one specific embodiment, the HMA may be 4-amino-1-β-D-ribofuranosyl-1,3,5-triazin-2(1H)-one, 4-amino-1-((2R,4R,5R)-4-hydroxy-5-(hydroxymethyl)tetrahydrofuran-2-yl)-1,3,5-triazin-2(1H)-one or a pharmaceutically acceptable salt or hydrate thereof.

In one specific embodiment, the HMA may be any one selected from 4-amino-1-β-D-ribofuranosyl-1,3,5-triazin-2(1H)-one, 4-amino-1-((2R,4R,5R)-4-hydroxy-5-(hydroxymethyl)tetrahydrofuran-2-yl)-1,3,5-triazin-2(1H)-one, a pharmaceutically acceptable salt or hydrate thereof, and the FLT3 inhibitor may be any one selected from the compound of Chemical Formula 1, a stereoisomer thereof, and a tautomer thereof.

In one specific embodiment, the HMA may be 4-amino-1-β-D-ribofuranosyl-1,3,5-triazin-2(1H)-one, or 4-amino-1-((2R,4R,5R)-4-hydroxy-5-(hydroxymethyl)tetrahydrofuran-2-yl)-1,3,5-triazin-2(1H)-one, and the FLT3 inhibitor may be any one selected from the compound of Chemical Formula 3, a stereoisomer thereof, and a tautomer thereof.

In one specific embodiment, the HMA may be 4-amino-1-β-D-ribofuranosyl-1,3,5-triazin-2(1H)-one, or 4-amino-1-((2R,4R,5R)-4-hydroxy-5-(hydroxymethyl)tetrahydrofuran-2-yl)-1,3,5-triazin-2(1H)-one, and the FLT3 inhibitor may be 5-chloro-N-(3-cyclopropyl-5-(((3R, 5S)-3,5-dimethylpiperazin-1-yl)methyl)phenyl)-4-(6-methyl-1H-indol-3-yl)pyrimidin-2-amine.

In one specific embodiment, the FLT3 inhibitor or a pharmaceutically acceptable salt or hydrate thereof, and the HMA or a pharmaceutically acceptable salt or hydrate thereof are comprised, wherein the HMA may be 4-amino-1-β-D-ribofuranosyl-1,3,5-triazin-2(1H)-one, and the FLT3 inhibitor may be any one selected from the compound of Chemical Formula 1, a stereoisomer thereof, and a tautomer thereof.

In one specific embodiment, the HMA may be 4-amino-1-β-D-ribofuranosyl-1,3,5-triazin-2(1H)-one, and the FLT3 inhibitor may be any one selected from the compound of Chemical Formula 3, a stereoisomer thereof, and a tautomer thereof.

In one specific embodiment, the HMA may be 4-amino-1-β-D-ribofuranosyl-1,3,5-triazin-2(1H)-one, and the FLT3 inhibitor may be 5-chloro-N-(3-cyclopropyl-5-(((3R,5S)-3,5-dimethylpiperazin-1-yl)methyl)phenyl)-4-(6-methyl-1H-indol-3-yl)pyrimidin-2-amine.

In one specific embodiment, the HMA may be 4-amino-1-((2R,4R,5R)-4-hydroxy-5-(hydroxymethyl)tetrahydrofuran-2-yl)-1,3,5-triazin-2(1H)-one, and the FLT3 inhibitor may be any one selected from the compound of Chemical Formula 1, a stereoisomer thereof, and a tautomer thereof.

In one specific embodiment, the HMA may be 4-amino-1-((2R,4R,5R)-4-hydroxy-5-(hydroxymethyl)tetrahydrofuran-2-yl)-1,3,5-triazin-2(1H)-one, and the FLT3 inhibitor may be any one selected from the compound of Chemical Formula 3, a stereoisomer thereof, and a tautomer thereof.

In one specific embodiment, the HMA may be 4-amino-1-((2R,4R,5R)-4-hydroxy-5-(hydroxymethyl)tetrahydrofuran-2-yl)-1,3,5-triazin-2(1H)-one, and the FLT3 inhibitor may be 5-chloro-N-(3-cyclopropyl-5-(((3R, 5S)-3,5-dimethylpiperazin-1-yl)methyl)phenyl)-4-(6-methyl-1H-indol-3-yl)pyrimidin-2-amine.

5-chloro-N-(3-cyclopropyl-5-(((3R,5S)-3,5-dimethylpiperazin-1-yl)methyl)phenyl)-4-(6-methyl-1H-indol-3-yl)pyrimidin-2-amine as the FLT3 inhibitor according to one specific embodiment inhibits kinases, such as SYK, which are known to be associated with AML resistance. Among them, SYK kinase transactivates FLT3 by a direct physical interaction, is critical for the development of FLT3-ITD-induced myeloid neoplasia, and is more highly activated in primary FLT3-ITD-positive AML. Therefore, activation of other signaling pathways of kinases such as SYK may contribute to resistance in the treatment of AML patients.

The FLT3 inhibitor according to one specific embodiment has excellent therapeutic effects on AML with FLT3 mutation, which has a high risk of recurrence after treatment, poor prognosis, and a reduction in overall survival.

The FLT3 inhibitor according to one specific embodiment exhibits clinical benefits in AML patients with resistance to traditional therapeutic agents. In about 30% of AMK patients, activating mutations in ITD of FLT3 and point mutations in TKD are reported to be oncogenic driver mutation. For example, the mutation of TKD may further comprise ITD.

In one specific embodiment, AML which is a therapeutic target of the pharmaceutical composition may be AML with FLT3 mutation.

The AML may have a mutation in TKD of an amino acid sequence of FLT3 (FLT3-TKD). The FLT3-TKD mutation may further comprise ITD. The FLT3-TKD mutation may comprise any one selected from FLT3(D835Y), FLT3

(F691L), FLT3(F691L/D835Y), FLT3(ITD/D835Y), FLT3 (ITD/F691L), and combinations thereof.

The pharmaceutical composition according to one specific embodiment, in which the FLT3 inhibitor or a pharmaceutically acceptable salt or solvate thereof, and the HMA or a pharmaceutically acceptable salt or solvate thereof are administered in combination, may have excellent therapeutic effects on AML with FLT3 mutations.

In one specific embodiment, the AML may be mutant FLT3 polynucleotide-positive AML, FLT3 ITD-positive AML, or AML with FLT3 point mutations.

In one specific embodiment, with regard to the pharmaceutical composition comprising any one FLT3 inhibitor of the compound of Chemical Formula 1 or a pharmaceutically acceptable salt or solvate thereof for treating AML, the AML may have mutations in TKD of the amino acid sequence of FLT3 (FLT3-TKD).

In one specific embodiment, the FLT3-TKD mutation may further comprise ITD.

In one specific embodiment, the FLT3-TKD mutation may comprise any one selected from FLT3(D835Y), FLT3(F691L), FLT3(F691L/D835Y), FLT3(ITD/D835Y), FLT3(ITD/F691L), and combinations thereof.

In one specific embodiment, the FLT3 inhibitor may be 5-chloro-N-(3-cyclopropyl-5-(((3R, 5S)-3,5-dimethylpiperazin-1-yl)methyl)phenyl)-4-(6-methyl-1H-indol-3-yl)pyrimidin-2-amine, or a pharmaceutically acceptable salt or hydrate thereof.

The pharmaceutical composition according to a specific embodiment may comprise the FLT3 inhibitor, or any pharmaceutically acceptable salt or hydrate thereof for treating AML with FLT3 mutation, for example, AML with FLT3 ITD and TKD point mutations, e.g., FLT3(ITD/D835Y) and FLT3(ITD/F691L) mutations.

The FLT3-TKD mutation may comprise one amino acid mutation or a plurality of amino acid mutations at positions 823 to 861 of the FLT3 amino acid sequence. The TKD mutation may comprise a mutation of at least one amino acid selected from the group consisting of amino acids at positions 835, 836, and 842 of the FLT3 amino acid sequence. For example, the TKD mutation may comprise a mutation of an amino acid at position 835 of the FLT3 amino acid sequence. For example, the TKD mutation may include substitution of valine, tyrosine, histidine, glutamic acid, or asparagine for aspartic acid at position 835 of the FLT3 amino acid sequence. For example, the TKD mutation may include substitution of leucine or aspartic acid for isoleucine at position 836 of the FLT3 amino acid sequence. For example, the TKD mutation may include substitution of cysteine or histidine for tyrosine at position 842 of the FLT3 amino acid sequence. For example, the mutation may be FLT3(D835Y).

The FLT3-TKD mutation may have a mutation of at least one amino acid selected from the group consisting of amino acids at positions 621, 627, 676, 691, and 697 of the FLT3 amino acid sequence. For example, the TKD mutation may have substitution of leucine for phenylalanine at position 691 of the FLT3 amino acid sequence. For example, the mutation may be FLT3(F691L).

The TKD mutation may further include ITD. For example, the mutation may be FLT3(ITD/D835Y) or FLT3(ITD/F691L).

5-chloro-N-(3-cyclopropyl-5-(((3R,5S)-3,5-dimethylpiperazin-1-yl)methyl)phenyl)-4-(6-methyl-1H-indol-3-yl)pyrimidin-2-amine as the FLT3 inhibitor according to one specific embodiment overcomes resistance caused by FLT3 mutations and shows therapeutic effects in an in vivo study using Ba/F3 cells expressed in an FLT3 ITD/F691L or FLT3 ITD/D835Y xenografted mouse model.

The FLT3 inhibitor according to one specific embodiment exhibits the effect capable of overcoming resistance of AML therapy. For example, the FLT3 inhibitor exhibits inhibitory activity against drug-resistant point mutants (D835Y, F691L, or F691L/D835Y) of FLT3 due to acquired D835Y and F691L point mutations in FLT3-TKD. In one specific embodiment, the TKD mutation may have substitution of tyrosine for aspartic acid at position 835 of the FLT3 amino acid sequence. In one specific embodiment, the mutation may be FLT3(D835Y) or FLT3(ITD/D835Y). In one specific embodiment, the TKD mutation may have substitution of leucine for phenylalanine at position 691 of the FLT3 amino acid sequence. The mutation may be FLT3(F691L) or FLT3(ITD/F691L).

As a result of an in vitro site-directed competition binding assay using AML resistance cell line, the FLT3 inhibitor according to one specific embodiment overcomes resistance due to FLT3 mutations and shows a therapeutic effect, demonstrated through a standard proliferation assay, immunoblotting, and apoptosis analysis.

The FLT3 inhibitor according to one specific embodiment strongly inhibits FLT3(ITD/D835Y) and FLT3(ITD/F691L) mutations in a preclinical study. The FLT3 inhibitor according to one specific embodiment exhibits high in vitro binding affinity to both the two mutations, and exhibits strong inhibitory activity in vitro and in vivo against a Ba/F3 cell line expressing FLT3(ITD/D835Y) or FLT3(ITD/F691L). Furthermore, the FLT3 inhibitor according to one specific embodiment exhibits high cytotoxicity in an MOLM-14 cell line harboring FLT3 ITD and overcomes FL-induced drug resistance. The FLT3 inhibitor according to one specific embodiment may strongly inhibit phosphorylation of SYK, STAT3, and STAT5 in KG-la cells.

Further, the FLT3 inhibitor according to one specific embodiment may exhibit a synergistic effect, when used in combination with another one or more therapeutic agents for leukemia, e.g., inhibitor of apoptosis protein (IAP) inhibitors or chemotherapy.

In one specific embodiment, the FLT3 inhibitor or a pharmaceutically acceptable salt or solvate thereof, and HMA or a pharmaceutically acceptable salt or solvate thereof may be administered simultaneously, sequentially, in reverse order, or individually.

In one embodiment, administration routes include, but are not limited to, oral, intravenous, intraarterial, intraperitoneal, intradermal, transdermal, intrathecal, intramuscular, intranasal, transmucosal, subcutaneous and rectal administration.

Formulations for administration according to one specific embodiment may be used after being formulated according to common methods in any appropriate formulation, including oral preparations such as tablets, powders, granules, capsules, suspensions, emulsions, syrups, aerosols, etc., external preparations such as ointments, creams, etc., injections, suppositories, and sterile injectable solutions, etc.

As the FLT3 inhibitor according to one specific embodiment, 5-chloro-N-(3-cyclopropyl-5-(((3R,5S)-3,5-dimethylpiperazin-1-yl)methyl)phenyl)-4-(6-methyl-1H-indol-3-yl)pyrimidin-2-amine, or any pharmaceutically acceptable salt or hydrate thereof may be orally administered.

As the HMA according to one specific embodiment, 4-amino-1-β-D-ribofuranosyl-1,3,5-triazin-2(1H)-one (ingredient name: azacitidine) may be administered intravenously, intraperitoneally, or subcutaneously.

As the HMA according to one specific embodiment, 4-amino-1-((2R,4R,5R)-4-hydroxy-5-(hydroxymethyl)tetrahydrofuran-2-yl)-1,3,5-triazin-2(1H)-one (ingredient name: decitabine) may be administered intravenously, intraperitoneally, or subcutaneously.

In one specific embodiment, the FLT3 inhibitor or a pharmaceutically acceptable salt or solvate thereof, and the HMA or a pharmaceutically acceptable salt or solvate thereof may be comprised in a therapeutically effective amount, respectively.

In one specific embodiment, the FLT3 inhibitor or a pharmaceutically acceptable salt or solvate thereof, and the HMA or a pharmaceutically acceptable salt or solvate thereof may be comprised as a therapeutic agent for AML in a therapeutically effective amount to be administered simultaneously, sequentially, in reverse order, or individually.

The FLT3 inhibitor in the pharmaceutical composition according to a specific embodiment may be administered in an amount of 0.01 mg to 3000 mg, e.g., 0.1 mg to 1000 mg or 6 mg to 600 mg. Alternatively, the FLT3 inhibitor may be administered in an amount of 0.001 mg/kg of body weight to 200 mg/kg of body weight, e.g., 0.05 mg/kg of body weight to 100 mg/kg of body weight, 0.1 mg/kg of body weight to 50 mg/kg of body weight, or 0.1 mg/kg of body weight to 10 mg/kg of body weight. Alternatively, the FLT3 inhibitor may be administered in a daily dose of 0.001 mg/kg of body weight to 200 mg/kg of body weight, e.g., in a daily dose of 0.05 mg/kg of body weight to 50 mg/kg of body weight or 0.1 mg/kg of body weight to 10 mg/kg of body weight. Alternatively, the FLT3 inhibitor may be administered in an amount of 0.01 mg/m$^2$ to 1000 mg/m$^2$ of body surface area, e.g., 3.7 mg/m$^2$ to 370 mg/m$^2$ of body surface area.

The HMA in the pharmaceutical composition according to a specific embodiment may be administered in an amount of 0.1 mg to 2000 mg, e.g., 1 mg to 1500 mg, 20 mg to 500 mg, or 1 mg to 150 mg. Alternatively, the HMA may be administered in an amount of 0.001 mg/kg of body weight to 400 mg/kg of body weight, e.g., 0.001 mg/kg of body weight to 100 mg/kg of body weight, or 0.2 mg/kg of body weight to 200 mg/kg of body weight. Alternatively, the HMA may be administered in a daily dose of 0.01 mg/kg of body weight to 300 mg/kg of body weight, e.g., in a daily dose of 0.2 mg/kg of body weight to 200 mg/kg of body weight or 0.017 mg/kg of body weight to 2.5 mg/kg of body weight. Alternatively, the HMA may be administered in an amount of 0.01 mg/m$^2$ to 1000 mg/m$^2$ of body surface area, e.g., 6 mg/m$^2$ to 92.5 mg/m$^2$ of body surface area or 7.4 mg/m$^2$ to 740 mg/m$^2$ of body surface area.

An amount of the combined two drugs to be administered to a patient may be determined by the attending diagnostician, as one skilled in the art, by the use of known techniques and by observing results obtained under analogous circumstances. In determining the effective amount or dose of the compound to be administered, a number of factors are considered by the attending diagnostician, including, but not limited to: species of a mammal; size, age, and general health thereof; specific neoplasm involved; degree or involvement or severity of the neoplasm; response of an individual patient; a particular compound administered; mode of administration; bioavailability characteristics of a preparation administered; a dose regimen selected; use of concomitant medication; and other relevant circumstances. For example, when orally administered, the daily dose may be about 0.001 mg/kg to about 100 mg/kg, for example, about 0.005 mg/kg to about 30 mg/kg, for example, about 0.01 mg/kg to about 10 mg/kg per a patient's body weight.

When intravenously administered, the daily dose may be appropriately about 0.0001 mg/kg to about 10 mg/kg of a patient's body weight, the whole being administered in one or more divided doses per day. In addition, a transmucosal preparation is administered at a dose of about 0.001 mg/kg to about 100 mg/kg per body weight, and may be administered once a day or dividedly administered several times a day. For example, azacitidine may be administered in an amount of about 250 mg to about 500 mg per day.

As the HMA according to one specific embodiment, 4-amino-1-β-D-ribofuranosyl-1,3,5-triazin-2(1H)-one (ingredient name: azacitidine, trade name: Vidaza) may be administered in an amount of about 5 mg per 1 m$^2$ of a patient's body surface area to about 125 mg per 1/m$^2$ of a patient's body surface area, e.g., in an amount of about 50 mg/m$^2$ to about 100 mg/m$^2$, e.g., in an amount of about 75 mg/m$^2$. A recommended starting dose for a first treatment cycle, for all patients regardless of baseline hematology laboratory values, is 75 mg/m$^2$ of Vidaza by subcutaneous (SC) or intravenous (IV) injection, daily for 7 days. Patients may be premedicated for nausea and vomiting. Treatment cycles may be repeated every 4 weeks. The dose may be increased to 100 mg/m$^2$, when no beneficial effect is not observed after 2 treatment cycles and when no toxicity other than nausea and vomiting has occurred. It is recommended that patients be treated for a minimum of 4 cycles to 6 cycles. Complete or partial response may require additional treatment cycles.

A dosage of the pharmaceutical composition according to one specific embodiment, or a dosage or a therapeutically effective amount of the FLT3 inhibitor and HMA in the composition may vary within a wide tolerance dose, and may be determined in a manner known in the art. The dosage will be adjusted according to individual requirements of each particular case, including a patient to be treated as well as a specific compound to be administered, route of administration (oral administration, parenteral administration), and conditions to be treated.

The daily dose may be administered as a single dose or as divided doses, or, in the case of parenteral administration, may be given as a continuous infusion.

The FLT3 inhibitor and the HMA in the pharmaceutical composition according to one specific embodiment may be administered simultaneously, sequentially, or individually without a specific time limit. Here, such administration means providing two compounds in therapeutically effective levels in the body of the patient. The interval between administrations may be several seconds, several minutes, several hours, or a predetermined number of days, and may have a pause, if necessary.

As used herein, the term "composition" or "pharmaceutical composition" refers to a mixture comprising the compound disclosed herein and at least one, and optionally, more than one other pharmaceutically acceptable chemical ingredient, e.g., a pharmaceutically acceptable additive.

The pharmaceutical composition may further include any one or more pharmaceutically acceptable additives selected from the group consisting of excipients, binders, disintegrants, lubricants, and any combination thereof. The additive is any substance known to those skilled in the art to be useful in the preparation of formulations, and may be adjusted as needed, for example, according to a mode of administration of a drug.

Another aspect of the present disclosure provides a pharmaceutical kit, wherein the pharmaceutical composition is administered simultaneously, sequentially, in reverse order, or individually.

Still another aspect of the present disclosure provides a pharmaceutical composition for treating AML, the pharmaceutical composition comprising the HMA, or a pharmaceutically acceptable salt or solvate thereof, which is administered in combination with the FLT3 inhibitor, a pharmaceutically acceptable salt or solvate thereof.

In one specific embodiment, the FLT3 inhibitor may be a compound selected from the compound of Chemical Formula 1, a stereoisomer thereof, a tautomer thereof, and a combination thereof.

In another specific embodiment, the FLT3 inhibitor may be a compound selected from the compound of Chemical Formula 3, a stereoisomer thereof, a tautomer thereof, and a combination thereof.

Still another aspect of the present disclosure provides a pharmaceutical combination for treating AML, the pharmaceutical combination comprising, as active ingredients, (a) the FLT3 inhibitor or any pharmaceutically acceptable salt or hydrate thereof, and (b) the HMA or any pharmaceutically acceptable salt or hydrate thereof, wherein these active ingredients are administered simultaneously, sequentially, in reverse order, or individually.

Still another aspect of the present disclosure provides a method of treating AML, the method including administering the following active ingredients simultaneously, sequentially, in reverse order, or individually:
(a) a therapeutically effective amount of the FLT3 inhibitor or any pharmaceutically acceptable salt or hydrate thereof; and
(b) the HMA or any pharmaceutically acceptable salt or hydrate thereof.

Still another aspect of the present disclosure provides a method of treating AML, the method including administering the following active ingredients simultaneously, sequentially, in reverse order, or individually:
(a) administering, to a patient, a therapeutically effective amount of the FLT3 inhibitor or any pharmaceutically acceptable salt or hydrate thereof; and
(b) administering, to the patient, the HMA or any pharmaceutically acceptable salt or hydrate thereof.

In one specific embodiment, at least one of (a) and (b) may be under the direction or control of a physician.

Still another aspect of the present disclosure provides a method of treating AML in a patient, the method including the following steps simultaneously, sequentially, in reverse order, or individually:
(a) prescribing a patient to self-administer a therapeutically effective amount of the FLT3 inhibitor or any pharmaceutically acceptable salt or hydrate thereof; and
(b) administering, to the patient, the HMA or any pharmaceutically acceptable salt or hydrate thereof.

One specific embodiment provides a pharmaceutical combination for treating AML, the pharmaceutical combination comprising, as active ingredients, the FLT3 inhibitor or any pharmaceutically acceptable salt or hydrate thereof, and the HMA or any pharmaceutically acceptable salt or hydrate thereof, wherein these two active ingredients are administered simultaneously, sequentially, or individually.

One specific embodiment provides a pharmaceutical combination comprising the FLT3 inhibitor or any pharmaceutically acceptable salt or hydrate thereof, and the HMA or any pharmaceutically acceptable salt or hydrate thereof. The FLT3 inhibitor and the HMA in the combination according to one specific embodiment include salts or hydrates produced from these two ingredients. For example, the production of the salts may be partially or completely performed.

One specific embodiment provides a method of treating a subject suffering from AML using the composition comprising, as active ingredients, the FLT3 inhibitor or any pharmaceutically acceptable salt or hydrate thereof, and the HMA or any pharmaceutically acceptable salt or hydrate thereof. In this regard, the two active ingredients may be administered simultaneously, sequentially, in reverse order, or individually. The treatment method according to one specific embodiment provides a method of treating AML with FLT3 mutations using the composition.

In one specific embodiment, the AML includes mutant FLT3 polynucleotide-positive AML, FLT3 ITD-positive AML, or AML with FLT3 point mutations.

Still another aspect of the present disclosure provides use of the combination comprising, as active ingredients, the FLT3 inhibitor or any pharmaceutically acceptable salt or hydrate thereof, and the HMA or any pharmaceutically acceptable salt or hydrate thereof in the preparation of a drug for treating AML.

The combination therapy of the FLT3 inhibitor and the HMA using the combination of one aspect according to the present disclosure has improved therapeutic effects, as compared with single administration of the FLT3 inhibitor or the HMA. The therapeutic effects by using the combination according to one specific embodiment exhibit a synergistic effect, where the combined effect of two or more drugs is greater than the arithmetical sum of the individual effects.

As used herein, the term "therapeutically effective amount" is an amount of the compound that treats AML, when administered in combination to a subject, i.e., a patient. An amount demonstrated to be a therapeutically effective amount for a specific subject at a predetermined moment may not be effective for 100% of subjects similarly treated for the disease, even though such a dose would be considered as a therapeutically effective amount by a clinician. An amount of the compound corresponding to a therapeutically effective amount may depend on a specific type of cancer, a stage of the cancer, age of a patient being treated, and other factors. In general, therapeutically effective amounts of these compounds are well known in the art.

In addition, the therapeutically effective amount may be a combination amount to treat AML, although one or both of the FLT3 inhibitor and the HMA is/are administered in a sub-therapeutically effective amount or dose. The sub-therapeutically effective amount is an amount of the compound that, when administered alone to a patient, does not completely inhibit biological activity of an intended target over time.

One aspect of the present disclosure includes administration or use of the combination at therapeutically effective intervals. The therapeutically effective interval is a period of time beginning when one of the compounds is administered to a patient and ending at the limit of the other compound at which the benefits of combined administration of the two compounds are maintained. Thus, combined administration may be performed simultaneously, sequentially, or in any order.

The time period or cycle of combined administration may be a total of 1 week, 28 days, 1 month, 2 months, 3 months, or 4 months, or more. The individual drugs may be each administered daily for the entire duration or only a portion of the time period or cycle. For example, for a 28-day cycle, the FLT3 inhibitor or any pharmaceutically acceptable salt or hydrate thereof may be administered daily for the cycle, whereas the HMA or any pharmaceutically acceptable salt or hydrate thereof may be administered for a portion of the period, such as for 5 consecutive days, 7 consecutive days, or 10 consecutive days, in which 5, 7, and 10 consecutive days may be the first 5, 7, or 10 days of the period or cycle, respectively.

As used herein, the term "combination" or "pharmaceutical combination" refers to a product produced by mixing or combining two or more active ingredients, and includes both fixed and non-fixed combinations of the active ingredients. The term "fixed combination" means that active ingredients, e.g., the compound disclosed herein and one or more additional therapeutic agents, are simultaneously administered to a subject in the form of a single entity or dosage. The term "non-fixed combination" means that active ingredients, e.g., the compound disclosed herein and one or more additional therapeutic agents are administered to a subject as separate entities either simultaneously, concurrently or sequentially with no specific time limits, wherein such administration provides therapeutically effective levels of the active ingredients for the body of the subject. The latter may also be applied to a cocktail therapy, for example, administration of three or more active ingredients.

As used herein, the term "subject" encompasses mammals including humans and non-mammals. Examples of mammals include humans, chimpanzees, apes, monkeys, cattle, horses, sheep, goats, pigs; rabbits, dogs, cats, rats, mice, guinea pigs, etc., but are not limited thereto. Examples of non-mammals include birds, fish, etc., but are not limited thereto.

As used herein, the term "treating", "treat", "to be treated", or "treatment" include restraining, slowing, arresting, reducing, or reversing the progression or severity of an existing symptom, disease, condition, or disorder.

As used herein, the term "to" refers to a range including the numerical values described before and after the term "to" as a lower limit and an upper limit, respectively. It means the interval between the numerical values including the numerical values described before and after. The numerical value may be a range obtained by selecting and combining any number of upper and/or lower limits.

With regard to industrial applicability herein, utility of this combination therapy is exemplified by positive effects in one or more studies, including description of one or more parameters.

Hereinafter, the present disclosure will be described in more detail with reference to the following exemplary embodiments and experimental exemplary embodiments. However, these exemplary embodiments and experimental exemplary embodiments are only for better understanding of the present disclosure, and the scope of the present disclosure is not limited thereto in any sense.

Example 1

Evaluation of Cell Growth Inhibitory Activity Under Conditions of Combination Treatment with Azacitidine By examining growth inhibition of an MOLM-13 (DSMZ no. ACC 554) cell line which was treated with, in combination, an FLT3 inhibitor, 5-chloro-N-(3-cyclopropyl-5-(((3R,5S)-3,5-dimethylpiperazin-1-yl)methyl)phenyl)-4-(6-methyl-1H-indol-3-yl)pyrimidin-2-amine (hereinafter, Compound A) and a hypomethylating agent (HMA), 4-amino-1-β-D-ribofuranosyl-1,3,5-triazin-2(1H)-one (hereinafter, azacitidine), an effect of combined treatment of the two drugs was tested. The MOLM-13 cell line cultured in an RPMI 1640 culture medium (RPMI=Rosewell Parker Memory Institute) supplemented with 20% FBS was inoculated at a density of $2\times10^4$ cells per well in a 96-well plate, and Compound A was subjected to ½ serial dilution at predetermined concentrations (e.g., 10 nM to 0.078 nM) using the same culture medium. Azacitidine was diluted using the culture medium at a concentration of 800 nM which is a concentration ($GI_{40}$) inhibiting MOLM-13 cell growth by about 40%, and then treated in combination with Compound A or treated alone, followed by incubation for 3 days. To measure cell viability, a CellTiter-Glo® (CTG) assay was performed, and for result analysis, 50% cell growth inhibition ($GI_{50}$) was calculated using a GraphPad Prism software. The results are shown in Table 3 and FIGS. 1 and 2.

Table 3 below shows data for MOLM-13 cell growth inhibitory activity by treatment with Compound A alone or by treatment in combination.

TABLE 3

| Compound | $GI_{50}$(nM) |
| --- | --- |
| Compound A alone | 2.5 |
| Compound A + Azacitidine | 0.44 |

FIG. 1 shows inhibition of MOLM-13 cell growth by treatment with Compound A and azacitidine in combination. The Y-axis represents a cell growth rate (%) and the X-axis represents a logarithmic concentration of Compound A (a logarithmic value of a unit concentration in nM).

Figure 2:
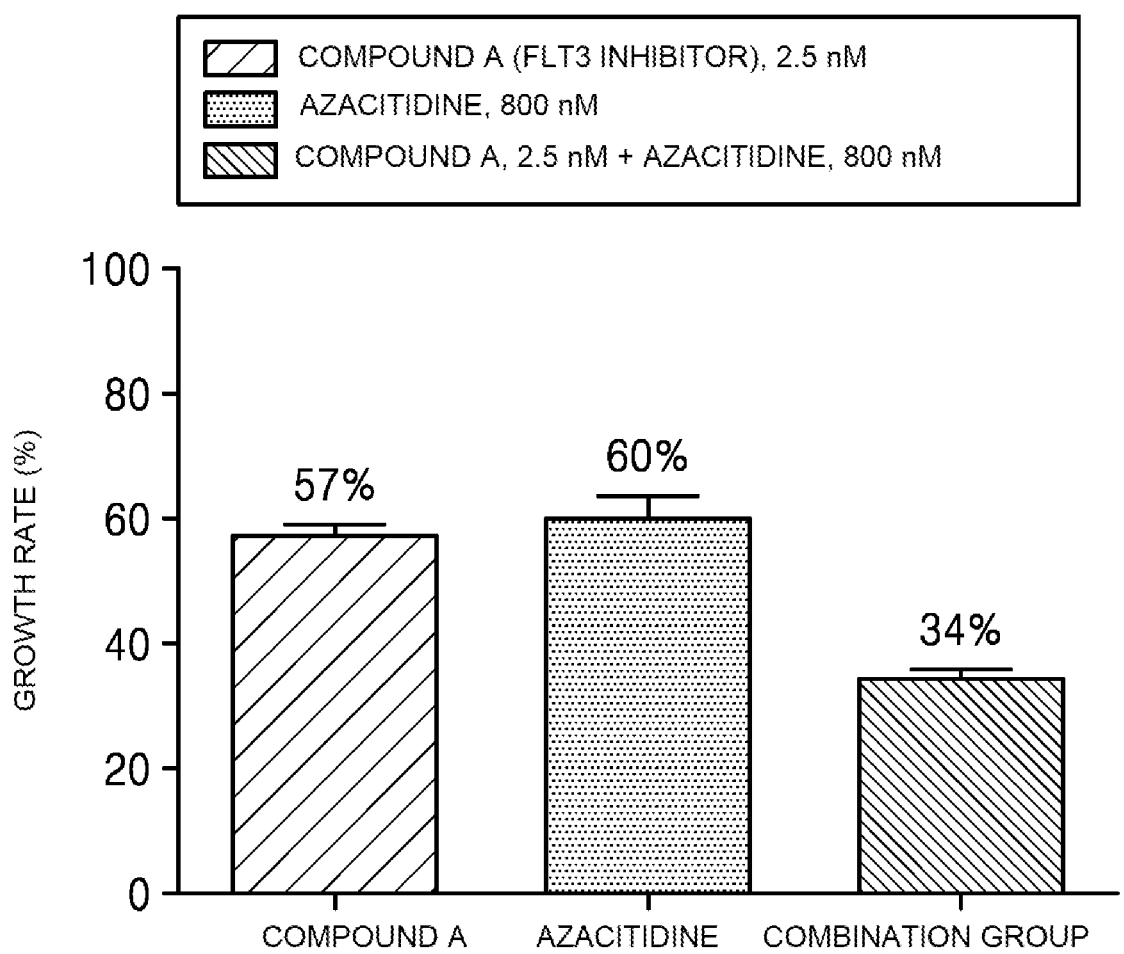
FIG. 2 shows inhibition of cell growth by treatment with 2.5 nM of Compound A, 800 nM of azacitidine, or combination of 2.5 nM of Compound A and 800 nM of azacitidine, wherein the Y-axis represents a cell growth rate (%) and the X-axis represents each experimental group.

FIG. 2 shows inhibition of cell growth by treatment with 2.5 nM of Compound A, 800 nM of azacitidine, or combination of 2.5 nM of Compound A and 800 nM of azacitidine, wherein the Y-axis represents a cell growth rate (%) and the X-axis represents each experimental group.

As a result, as shown in Table 3 and FIGS. 1 and 2, combination treatment with Compound A and azacitidine exhibited excellent cell growth inhibitory effect, as compared with treatment with Compound A alone or azacitidine alone.

Example 2

Mouse Model Xenografted with MOLM-13-Luc2 Cell Line

A comparison of Compound A and azacitidine or an efficacy test of combination thereof was conducted in a mouse model xenografted with a MOLM-13-Luc2 cell line which is a MOLM-13 cell line genetically modified to express luciferase.

The MOLM-13-Luc2 cell line was injected to a tail vein of NOG mouse at $5\times10^6$ cells/0.1 mL/mouse, and allowed to grow.

Bioluminescence images of MOLM-13-Luc2 cells were measured using a Lumina III IVIS imaging system (PerkinElmer) and quantified using a Living image software (PerkinElmer). When measured, D-luciferin (D-luciferin) was intraperitoneally injected to mice, and imaging was were performed under anesthesia using isoflurane. Images were measured for a first group separation during the experiment, and then measured on a specific day according to the purpose of the test.

A control group orally received a DMSO/PEG400/DW (ratio=0.5/2/7.5, v/v) mixed solution once a day, and a Compound A group was orally administered once a day at a dose of 10 mg/kg/day. An azacitidine group which is a hypomethylating agent (HMA) group was intraperitoneally administered at a dose of 3 mg/kg/day twice a week (on day 1 and day 4 of the week). A combination group was orally administered with Compound A at a dose of 10 mg/kg/day once a day, and azacitidine was intraperitoneally administered at a dose of 3 mg/kg/day twice a week (on day 1 and day 4 every week). Each group received individual drugs until all subjects in each group died.

Figure 3:
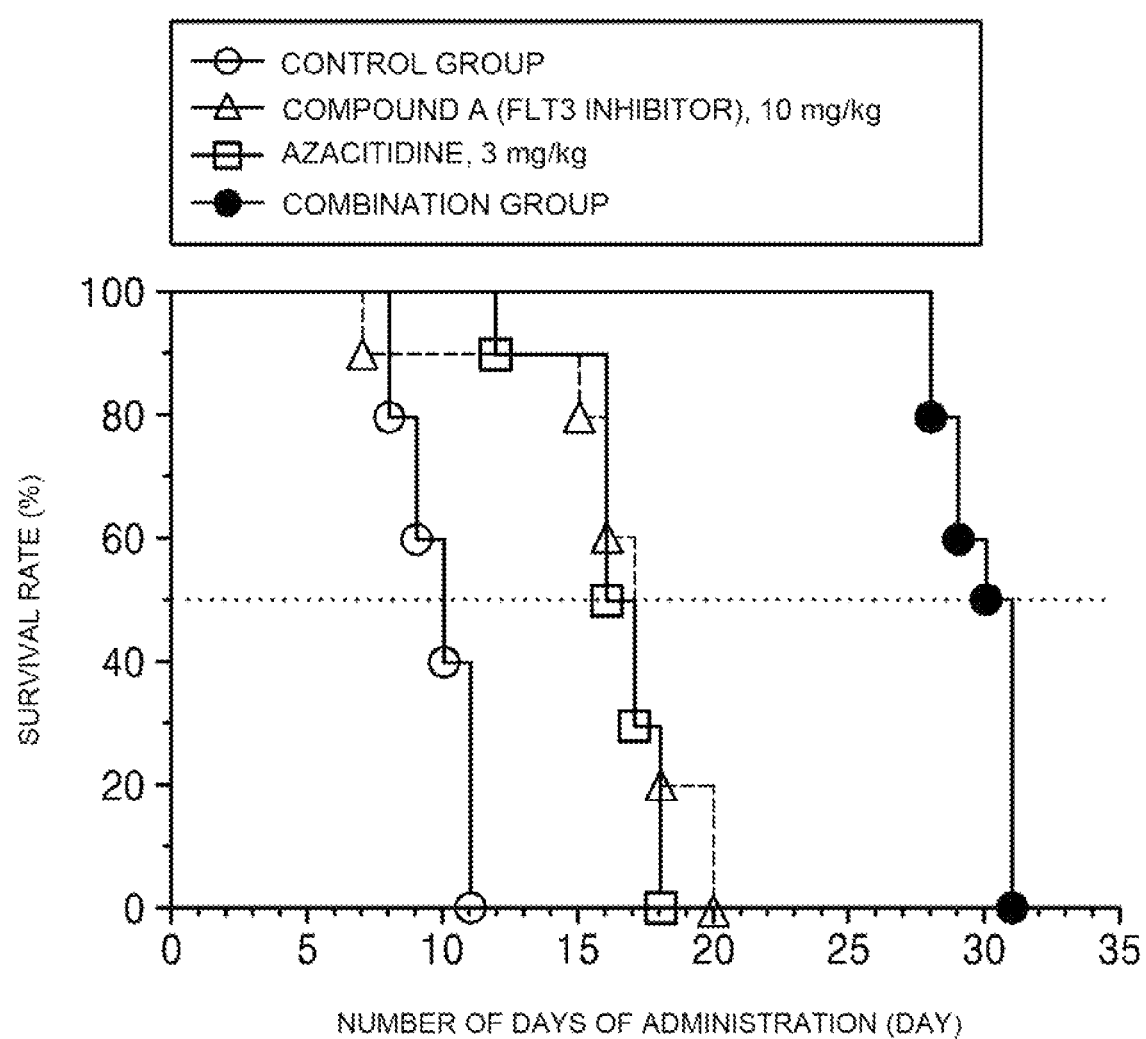
FIG. 3 shows anti-tumor effects when nude mice xenografted with an MOLM-13-Luc2 cell line were treated with Compound A and azacitidine in combination, wherein the Y-axis represents a percentage (%) of surviving mice (survival rate) in each experimental group, and the X-axis represents the number of days of administration.

The experimental results are shown in FIG. 3. FIG. 3 shows anti-tumor effects when nude mice xenografted with the MOLM-13-Luc2 cell line were treated with Compound A (FLT3 inhibitor) and azacitidine in combination. The Y-axis represents a percentage (%) of surviving mice (survival rate) in each experimental group, and the X-axis represents the number of days of administration.

As shown in FIG. 3, the antitumor effects according to drug administration were examined by measuring the survival period, and as a result, a median survival period and an overall survival period in the combination group were 30 days and 31 days, respectively. In addition, as shown in FIG. 3, the results were higher than the median survival period (16 days) and the overall survival period (18 days) in the azacitidine-administered group, which is an HMA-administered group, and were higher than the median survival period (17 days) and the overall survival period (20 days) in the Compound A-administered group.

In addition, from the experimental results using a mouse efficacy model orthotopic transplanted with MOLM-13-Luc2 shown in FIG. 3, the combination group of FLT3 inhibitor and HMA showed the increased survival period and better antitumor efficacy, as compared with the group administered with Compound A alone which is an FLT3 inhibitor (single treatment with Compound A) or the group administered with HMA alone (single treatment with azacitidine).

Further, the above results indicate that combination of 5-chloro-N-(3-cyclopropyl-5-(((3R,5S)-3,5-dimethylpiperazin-1-yl)methyl)phenyl)-4-(6-methyl-1H-indol-3-yl)pyrimidin-2-amine which is an FLT3 inhibitor and 4-amino-1-β-D-ribofuranosyl-1,3,5-triazin-2(1H)-one (azacitidine) which is an HMA exhibits improved anti-tumor effects.

The present disclosure has been described with reference to specific embodiments. It will be understood by those skilled in the art that various changes may be made therein without departing from the spirit and scope of the present disclosure. Therefore, it should be understood that specific embodiments described herein should be considered in a descriptive sense only and not for purposes of limitation. The scope of the present disclosure is defined by the appended claims rather than by the foregoing description, and all differences within the scope of equivalents thereof should be construed as being included in the present invention.

The invention claimed is:

1. A method of treating acute myeloid leukemia (AML) in a subject in need thereof, wherein the method comprises administering to the subject an Fms-like tyrosine kinase-3 (FLT3) inhibitor or a pharmaceutically acceptable salt or solvate thereof,
in combination with an hypomethylating agent (HMA) or a pharmaceutically acceptable salt or solvate thereof,
wherein the FLT3 inhibitor is 5-chloro-N-(3-cyclopropyl-5-(((3R, 5S)-3,5-dimethylpiperazin-1-yl)methyl)phenyl)-4-(6-methyl-1H-indol-3-yl)pyrimidin-2-amine having a structure

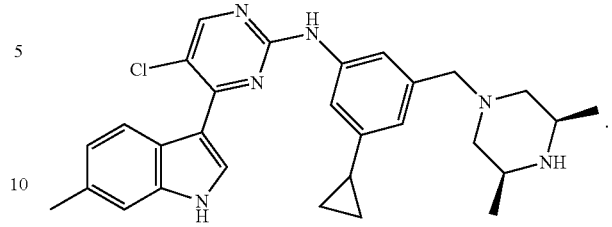

(Compound A)

2. The method of claim 1, wherein the HMA is any one selected from the group consisting of 4-amino-1-β-D-ribofuranosyl-1,3,5-triazin-2 (1H)-one or 4-amino-1-((2R,4R,5R)-4-hydroxy-5-(hydroxymethyl)tetrahydrofuran-2-yl)-1,3,5-triazin-2 (1H)-one, and a pharmaceutically acceptable salt thereof, or hydrate thereof.

3. The method of claim 2, wherein the HMA is 4-amino-1-β-D-ribofuranosyl-1,3,5-triazin-2 (1H)-one or 4-amino-1-((2R,4R,5R)-4-hydroxy-5-(hydroxymethyl)tetrahydrofuran-2-yl)-1,3,5-triazin-2 (1H)-one, or a pharmaceutically acceptable salt thereof.

4. The method of claim 3, wherein the HMA is 4-amino-1-β-D-ribofuranosyl-1,3,5-triazin-2 (1H)-one, or 4-amino-1-((2R,4R,5R)-4-hydroxy-5-(hydroxymethyl)tetrahydrofuran-2-yl)-1,3,5-triazin-2 (1H)-one.

5. The method of claim 2, wherein the FLT3 inhibitor or a pharmaceutically acceptable salt or solvate hydrate thereof, and the HMA or a pharmaceutically acceptable salt or hydrate thereof are contained in a same formulation.

6. The method of claim 1, wherein the AML is mutant FLT3 polynucleotide-positive AML, FLT3 internal tandem duplication (ITD)-positive AML, or AML with FLT3 point mutations.

7. The method of claim 1,
wherein the AML has a mutation in a tyrosine kinase domain (TKD) of an FLT3 amino acid sequence (FLT3-TKD).

8. The method of claim 7, wherein the FLT3-TKD mutation further comprises an internal tandem duplication (ITD).

9. The method of claim 7, wherein the FLT3-TKD mutation comprises any one selected from the group consisting of FLT3(D835Y), FLT3(F691L), FLT3(F691L/D835Y), FLT3(ITD/D835Y), FLT3(ITD/F691L), and a combination thereof.

10. The method of claim 7, wherein the FLT3 inhibitor is 5-chloro-N-(3-cyclopropyl-5-(((3R, 5S)-3,5-dimethylpiperazin-1-yl)methyl)phenyl)-4-(6-methyl-1H-indol-3-yl)pyrimidin-2-amine, or a pharmaceutically acceptable salt thereof.

11. The method of claim 1, wherein the FLT3 inhibitor or a pharmaceutically acceptable salt or solvate thereof and the HMA or a pharmaceutically acceptable salt or solvate thereof are administered simultaneously, sequentially, in reverse order, or as a single formulation.

* * * * *